United States Patent
Kerber et al.

(10) Patent No.: US 10,072,188 B2
(45) Date of Patent: Sep. 11, 2018

(54) PRESSURE-SENSITIVE ADHESIVES FOR BONDING FLEXIBLE PRINTING PLATES

(71) Applicant: TESA SE, Norderstedt (DE)

(72) Inventors: Kristin Kerber, Hamburg (DE); Kai Ellringmann, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/647,893

(22) Filed: Jul. 12, 2017

(65) Prior Publication Data

US 2018/0022975 A1   Jan. 25, 2018

(30) Foreign Application Priority Data

Jul. 19, 2016 (DE) .................. 10 2016 213 183

(51) Int. Cl.
*C09J 133/24* (2006.01)
*B41C 1/18* (2006.01)
(Continued)

(52) U.S. Cl.
CPC .............. *C09J 133/24* (2013.01); *B41C 1/182* (2013.01); *B41N 6/02* (2013.01); *C09J 5/00* (2013.01); *C09J 11/06* (2013.01); *C09J 133/08* (2013.01); *C08K 5/05* (2013.01); *C08K 5/07* (2013.01); *C08K 5/11* (2013.01); *C08K 5/17* (2013.01); *C09J 2201/606* (2013.01); *C09J 2433/00* (2013.01)

(58) Field of Classification Search
CPC ...................................................... C09J 133/24
See application file for complete search history.

(56) References Cited

U.S. PATENT DOCUMENTS

| 7,067,581 B2 | 6/2006 | Husemann et al. |
| 8,333,865 B2 | 12/2012 | Husemann et al. |

(Continued)

FOREIGN PATENT DOCUMENTS

| DE | 103 14 898 A1 | 8/2004 |
| EP | 0 760 389 A1 | 3/1997 |

(Continued)

OTHER PUBLICATIONS

German Search Report dated Mar. 24, 2017.
European Search Report dated Oct. 12, 2017 corresponds to EP application No. 17001196.9.

*Primary Examiner* — Daniel H Lee
(74) *Attorney, Agent, or Firm* — Norris McLaughlin & Marcus P.A.

(57) ABSTRACT

A pressure-sensitive adhesive comprising at least one adhesive component comprising at least one polymer component based on a monomer mixture comprising at least one of the following monomers:
  at least one acrylic ester
  at least one methacrylic ester
  acrylic acid
  methacrylic acid
is particularly suitable for the bonding of printing plates, particularly to printing cylinders and/or printing sleeves, if the pressure-sensitive adhesive further comprises 1 to 25 wt %, preferably 2 to 20 wt %, based in each case on the overall blend of the at least one adhesive component without solvent, of at least one compound selected from the group consisting of stearyl alcohol, aliphatic and aromatic dicarboxylic esters, acetylated polyols and ethoxylated fatty acid amines.

10 Claims, 3 Drawing Sheets

(51) Int. Cl.
*C09J 5/00* (2006.01)
*C09J 11/06* (2006.01)
*C09J 133/08* (2006.01)
*B41N 6/02* (2006.01)
C08K 5/05 (2006.01)
C08K 5/07 (2006.01)
C08K 5/11 (2006.01)
C08K 5/17 (2006.01)

(56) References Cited

U.S. PATENT DOCUMENTS

| | | |
|---|---|---|
| 8,962,777 B2 | 2/2015 | Ellringmann et al. |
| 9,260,637 B2 | 2/2016 | Ellringmann et al. |
| 9,333,182 B2 | 5/2016 | Komoda |
| 9,475,966 B2 | 10/2016 | Ellringmann et al. |
| 2004/0260030 A1 | 12/2004 | Husemann et al. |
| 2005/0064181 A1 | 3/2005 | Blank et al. |
| 2008/0044611 A1 | 2/2008 | Husemann et al. |
| 2010/0043969 A1 | 2/2010 | Husemann et al. |
| 2011/0166311 A1 | 7/2011 | Ellringmann et al. |
| 2015/0114558 A1 | 4/2015 | Ellringmann et al. |
| 2015/0175852 A1* | 6/2015 | Ellringmann ............ B41N 6/02 156/332 |

FOREIGN PATENT DOCUMENTS

| | | |
|---|---|---|
| EP | 1 489 153 A1 | 12/2004 |
| EP | 2 226 372 A1 | 9/2010 |
| WO | 03/057497 A1 | 7/2003 |
| WO | 2004/067661 A2 | 8/2004 |
| WO | 2014/001096 A1 | 1/2014 |

* cited by examiner

PRESSURE-SENSITIVE ADHESIVES FOR BONDING FLEXIBLE PRINTING PLATES

This application claims priority of German Patent Application No. 10 2016 213 183.4, filed on Jul. 19, 2016, the entire contents of which is incorporated herein by reference.

The invention relates to the use of a pressure-sensitive adhesive comprising at least one adhesive component comprising at least one polymer component based on a monomer mixture comprising at least one of the following monomers—at least one acrylic ester, at least one methacrylic ester, acrylic acid and/or methacrylic acid—for the bonding of printing plates, particularly to printing cylinders and/or printing sleeves, and also to such use wherein the pressure-sensitive adhesive is provided in the form of an adhesive tape.

BACKGROUND OF THE INVENTION

There are various processes known within the printing industry for transferring designs by means of print originals to paper or films, for example. One possibility is that known as flexographic printing.

In the flexographic printing process, flexible printing plates are bonded to printing cylinders or printing sleeves. Such plates consist, for example, of a polyethylene terephthalate film (PET film) on which there is applied a photopolymer layer into which the appropriate print relief can be introduced by exposure of the print elements and subsequent washing-out of the non-print elements. The plate is then bonded to the printing cylinder or printing sleeve by way of the PET film. For the bonding, generally speaking, double-sided pressure-sensitive adhesive tapes are used, on which very stringent requirements are imposed. For the printing operation, the pressure-sensitive adhesive tape is required to have a certain hardness, but also a certain elasticity. These properties must be set very precisely in order that the printed image produced yields the desired outcome in accordance with the requirements. Stringent requirements are likewise imposed on the pressure-sensitive adhesive (PSA), since the peel adhesion ought likewise to be sufficient so that the printing plate does not detach from the double-sided pressure-sensitive adhesive tape, or the pressure-sensitive adhesive tape from the cylinder or sleeve. This must be so even at elevated temperatures of 40 to 60° C. and at relatively high printing speeds. In addition to this property, however, the PSA must also possess reversible adhesion properties, to allow the printing plates to be detached again after the printing operations (in that situation, the adhesive bond of the pressure-sensitive adhesive tape to the printing cylinder or printing sleeve, and also the adhesive bond to the plate, must be able to be parted without residue, in order to ensure that both components can be used again). This detachability ought also to exist even after bonding over a relatively long period (up to 6 months). It is desirable, moreover, for it to be possible to remove the pressure-sensitive adhesive tape and especially the printing plate without destruction thereof, and also without great application of force, since in general the printing plates are used a number of times. Furthermore, there should be no residues on the printing plate and on the cylinder or sleeve. In summary, therefore, very exacting requirements are imposed on the double-sided pressure-sensitive adhesive tapes suitable for this use.

Residue-free redetachability is a problem especially in the case of polar substrates such as steel, for example, since here it has been found that the peel adhesion increases considerably over the course of time. For the purposes of the present specification, in relation to surfaces, the terms "polar" and "high-energy", i.e., having a high surface energy (SE), are equated, as are the terms "nonpolar" and "low-energy", since this simplifying model has become established in the art. The finding that lies behind this is that polar dipole forces are comparatively strong relative to what are called "disperse" or nonpolar interactions, which are built up without participation of permanent molecular dipoles. The basis for this model of interfacial energy and interfacial interactions is the idea that polar components interact only with polar components, and nonpolar components only with nonpolar components.

This energy and its components are often measured by measurement of the static contact angles of different test liquids. The surface tensions of these liquids are assigned polar and nonpolar components. From the contact angles observed between the droplets and the test surface, the polar and nonpolar components of the surface energy for the test surface are ascertained. This can be done, for example, according to the OWKR model. One alternative method customary industrially is the determination using test inks according to DIN ISO 8296.

Examples of possible pressure-sensitive adhesives include those based on natural rubber, as documented by EP 760 389 A, for example. Also employed for the stated purpose, however, are pressure-sensitive adhesive tapes having polyacrylate-based PSAs. Accordingly, for example, WO 03/057497 A describes an acrylate PSA based on block copolymer for the stated application. WO 2004/067661 A discloses a pressure-sensitive adhesive tape with a PSA based on at least 49.5 wt % of a soft acrylic monomer ($T_g$<−20° C.); of a hard, cyclic or linear (meth)acrylic ester monomer ($T_g$>30° C.); at least 10 wt % of hard (meth) acrylic acid/ester monomers ($T_g$>30° C.) and at least 0.5 wt % of functionalized hard (meth)acrylic acid/ester monomers ($T_g$>30° C.), the PSA being produced in a two-stage method.

A further disadvantage of many PSAs known from the prior art for the adhesive bonding of printing plates is manifested especially when the bonded printing plates are to be cleaned to remove the printing ink. This is normally brought about by using the solvents that also serve as solvents for the inks themselves, in large amounts, for washing and removing the inks from the plates. Inevitably in this procedure, there is creepage of solvent below the edges of the bond of the plate on the pressure-sensitive adhesive tape, and of the edges of the adhesive tape on the printing cylinder or printing sleeve. This results in detachment of the bond (of the plate to the adhesive tape and of the adhesive tape to the cylinder or sleeve), since the adhesives of the pressure-sensitive adhesive tape lose the necessary adhesion. The lifted edges ("flags") produced as a result of this lack of solvent resistance are simultaneously printed in the process, as a result of which a flawed printed image (generally known as a misprint) is produced, if there are not, indeed, mechanical problems with the flags in the printing apparatus and hence system outages. In practice, therefore, the bonds on printing plates mounted with prior-art adhesives have to be protected from the solvent by sealing of the respective edges with single-sided pressure-sensitive adhesive tapes or with liquid adhesives or hotmelt adhesives.

This additional sealing operation implies a significant extra expense, and the risk exists of damaging the expensive printing plates on demounting, particularly where liquid adhesives or hotmelt adhesives are used.

EP 2 226 372 A1 discloses an acrylate-based PSA for the bonding of printing plates to cylinders or sleeves that has a high acrylic acid fraction of between 8 and 15 wt %. Further monomers are linear and branched acrylic esters, and are present in a defined ratio to one another. Using such an adhesive, the requirements in terms of edge lifting behaviour and solvent resistance are met very well. PSAs with a high acrylic acid fraction, however, are prone to strong peel increase on polar substrates, such as steel, which is commonly the material for printing cylinders. Also being used increasingly are plastic sleeves, very often based on polyurethane. The adhesives on the printing sleeve side must adhere both to steel and to low-energy sleeve surfaces, and this poses an additional challenge in the development process. This problem also arises with the adhesive of EP 2 226 372 A1, particularly if it is used on the side of the adhesive tape facing the printing cylinder or printing sleeve. Demounting such adhesives from such substrates, therefore, entails problems; very high demounting forces arise, and the adhesive tape used may fracture, or residues remain on the substrate.

In order to provide a PSA which, even under the influence of solvents, ensures effective and reliable bonding to material common in flexographic printing, such as to PET (polyethylene terephthalate) in particular, but which nevertheless is still redetachable even after a prolonged time and even from highly polar substrates, such as the surfaces of steel printing cylinders or the surfaces of certain printing sleeves comprising polar plastic surfaces, for example, where the PSA ought preferably to be suitable in particular for the reliable bonding of printing plates, and where, for an adhesive tape with the PSA, the stability of the adhesive tape assembly, particularly the reliable anchoring of the PSA on foam carriers—such as polyolefinic foams—is to be ensured, WO2014/001096 A1 discloses an acrylate-based PSA which comprises 2 to 20 wt % of an N-alkyl-substituted acrylamide and 5 to 25 wt % of a (meth)acrylic ester having a linear alkyl radical having at least 12 carbon atoms, and 0.5 to 5 wt % of (meth)acrylic acid.

While such PSAs do have properties that are an improvement on the prior art, it has nevertheless emerged that the adhesive bond between the printing plates and the PSAs, which are per se reversibly bonding, becomes primed by impurities in the solvents with which the printing plates are cleaned after printing.

"Priming" or the "priming effect" in the present case is understood to mean that, as compared with printing plates cleaned with pure solvent, the bond strength of the PSA to the printing plates soiled by ink residues included in the solvents is significantly increased.

The impurities arise from ink residues from the printing inks in the solvents used for cleaning; even such small quantities of impurities that are not even visible are sufficient to bring about this effect. In this way, over time, significantly higher bond strengths are formed than is desirable for redetachment of the plates. In some cases the printing plates can be detached only with very high force application, as a result of which they may also be damaged, making it impossible for the plates to be used again. In order to avoid this, the printer is compelled to use fresh solvent and fresh cleaning cloths for each cleaning operation. Apart from the increased time and materials consumed in this case, it is hardly possible for this to be implemented in practice. Particularly because the soiling present is often not apparent to the eye, there is no acceptance among users to replacing solvents and cleaning cloths.

It is an object of the present invention, therefore, to provide a pressure-sensitive adhesive which in the bonding of printing plates, especially to printing cylinders and/or printing sleeves, as well as the aforementioned requirements, namely:

assurance of effective and reliable bonding to material common in flexographic printing such as, in particular, to PET (polyethylene terephthalate), even under the influence of solvents;

detachability even after prolonged time even from highly polar substrates such as, for example, the surfaces of steel printing cylinders or the surfaces of certain printing sleeves comprising polar plastic surfaces;

suitability for reliable adhesive bonding of printing plates; for an adhesive tape featuring the PSA, the stability of the adhesive tape assembly, especially the reliable anchoring of the PSA on foam carriers such as polyolefinic foams is to be ensured;

also counteracts the unwanted priming effect of the printing-ink residues in the solvents with which the printing plates are cleaned, and which therefore exhibits so-called "ink resistance", being insensitive to the influence of the printing-ink residues in the cleaning solvent. The bond strength of the PSA to surfaces soiled in this way may be equated with a physical anchoring whose cause may be attributed to at least one binder (also called film-former) present in printing inks. One binder, among others, commonly used in printing inks is cellulose nitrate (in common parlance "nitrocellulose"), which is able to develop interaction with the PSA on the bond area and hence is known to cause this primer effect.

SUMMARY OF THE INVENTION

The object is achieved with a pressure-sensitive adhesive (PSA) for the bonding of printing plates, particularly to printing cylinders and/or printing sleeves, of the type specified at the outset, in that the pressure-sensitive adhesive further comprises 1 to 25 wt %, preferably 2 to 20 wt % and more preferably 5 to 12.5 wt %, based in each case on the overall blend without solvent, of at least one compound selected from the group consisting of stearyl alcohol, aliphatic dicarboxylic esters, acetylated polyols and ethoxylated fatty acid amines.

Surprisingly it has emerged that the addition of the compounds of the invention, also referred to as "additives", significantly reduces the resistance of the PSA to influences of printing-ink residues. This is manifested in a low value for the application of force (increased as a result of the ink residues on the surface) required to detach a plate from the cylinder or the sleeve. More particularly, the force application is increased only slightly, preferably only unnoticeably, and more particularly not at all, relative to the force application needed for detachment with the same PSA without the influence of the printing-ink residues.

DETAILED DESCRIPTION

Figure 1:
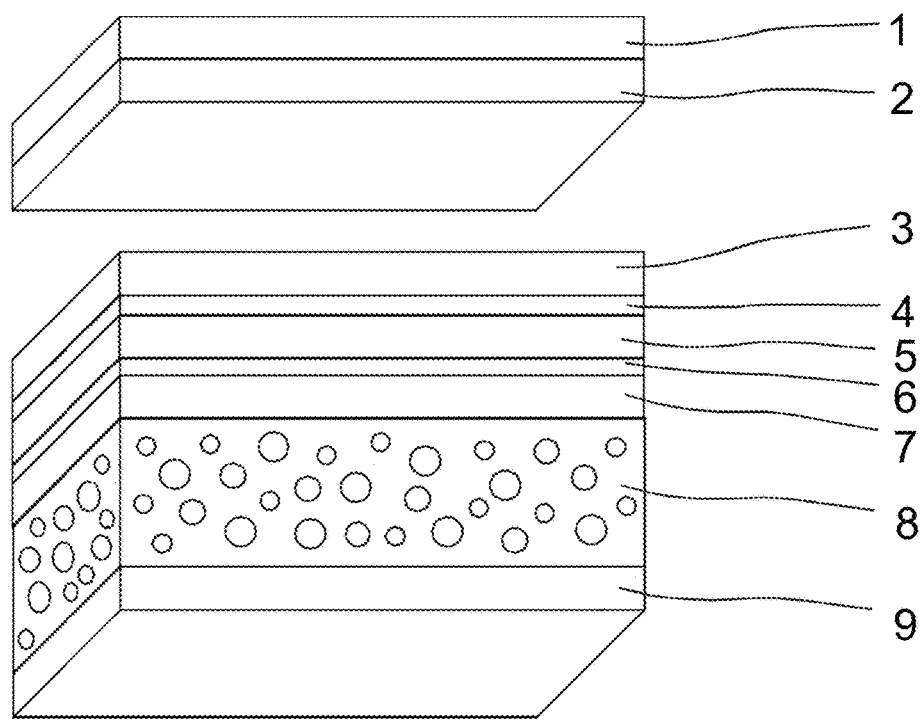
FIG. 1 illustrates the construction of the adhesive tape of the invention.

The term "pressure-sensitive adhesive" (PSA) refers, as is customary, to those viscoelastic, polymeric adhesives which—optionally as a result of appropriate additization with further components, such as tackifier resins, for example—are durably tacky and permanently adhesive at the application temperature (room temperature, i.e., 23° C., unless otherwise defined) and adhere to a multiplicity of surfaces on contact, with adhesion more particularly being instantaneous (which exhibit what is called "tack" [also referred to as stickiness or touch-stickiness]). They are capable, even at the application temperature and without activation by solvent or by heat—but optionally under the influence of a more or less high pressure—of wetting a bond substrate sufficiently to allow interactions sufficient for adhesion to develop between the adhesive and the substrate.

PSAs consist customarily of a polymer component, also called base polymer component, which may be a homopolymer, a copolymer, or a mixture of polymers (homopolymers and/or copolymers), and optionally adjuvants (co-components, additives), sometimes to a considerable extent. The expression "polymer component based on a monomer mixture" means here, as is generally the usual case, that the polymer can be obtained by polymerization—more particularly radical polymerization—of the corresponding monomer mixture, in particular by a process as described in the Experimental section.

PSAs can be produced in principle on the basis of polymers of different chemical types. The pressure-sensitive adhesion properties are influenced by factors including the nature and the proportions of the monomers employed—that is, the composition of the monomer mixture—in the polymerization of the polymers from which the PSA derives, the average molar mass and the molar mass distribution of the polymers, and optional admixing of adjuvants (type and amount).

In order for the viscoelastic properties to be obtained, the monomers which provide a basis for the PSA's parent polymers, and also any further components of the PSA that are present, are selected in particular such that the PSA has a glass transition temperature $T_g$ below the application temperature (usually, in other words, below room temperature). Beneath the glass transition temperature $T_g$, PSAs exhibit brittle-elastic (glasslike-amorphous or semicrystalline) behaviour; here it is not possible for pressure-sensitive adhesion behaviour to develop. Above the glass transition temperature $T_g$, the adhesives soften to a greater or lesser extent with increasing temperature, according to their composition, and, within a particular temperature range, adopt the viscosity values that are suitable for the pressure-sensitive adhesion properties, before, at even higher temperatures, becoming too highly mobile still to possess pressure-sensitive adhesion properties (unless they undergo decomposition beforehand).

Glass transition temperatures are cited as the result of measurements by differential scanning calorimetry DSC according to DIN 53 765, particularly sections 7.1 and 8.1, but with uniform heating and cooling rates of 10 K/min in all heating and cooling steps (cf. DIN 53 765, section 7.1, note 1). The initial sample mass is 20 mg. The PSA is pretreated (cf. section 7.1, first run). Temperature limits: −140° C. (instead of $T_g$−50° C.)/+200° C. (instead of $T_g$+50° C.). The reported glass transition temperature $T_g$ is the sample temperature in the heating operation of the second run at which half of the change in specific heat capacity has been reached.

The glass transition temperatures, as a characteristic feature of the monomers used, are specified in relation to the respective homopolymer of each of the monomers, obtainable according to the synthesis protocol for acrylate PSAs, in the Experimental section, using 400 g of the respective monomers rather than the monomer mixture. The $T_g$ is determined after removal of the solvent, in the non-crosslinked state (in the absence of crosslinkers).

A further criterion for suitability as a PSA is the cohesion. The polymer composition is normally required to exhibit sufficient cohesion to be able to mediate the adhesion on bonding, and not to run from the adhesive joint. By suitable cohesion-boosting measures, such as crosslinking reactions (formation of bridge-forming links between macromolecules), for example, it is possible to set, enlarge and/or shift the temperature range within which a polymer composition has pressure-sensitive adhesion properties. The range of application of the PSAs may therefore be optimized by an adjustment between flowability and cohesion of the adhesive.

Particularly preferred compounds to be added to the PSA, or additives, for use in accordance with the present invention are, among the dicarboxylic esters, those whose carboxylic acid frameworks have 4 to 16 carbon atoms, more particularly adipates and sebacates; among the acetylated polyols, furthermore, particular preference is given to di-, tri- and tetraols, especially the glycerol acetates. Particularly suitable here as the at least one compound is a compound selected from the group consisting of polyethylene(15) cocosamine (tradename Ethomeen C25), ethoxylated(15)N-tallow-1,3-diaminopropane (tradename Ethoduomeen T25), oleylamine oxethylate (tradename Genamin O200), benzyl 2-ethylhexyl adipate, di-n-butyl adipate, di-2-ethylhexyl adipate, glycerol acetate, dibutyl sebacate and di-(2-ethylhexyl)-sebacate.

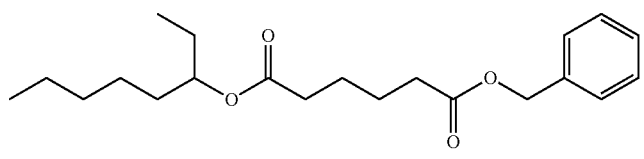

Adimoll BO (benzyl 2-ethylhexyl adipate)

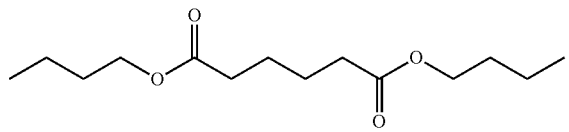

Adimoll DB (di-n-butyl adipate)

-continued

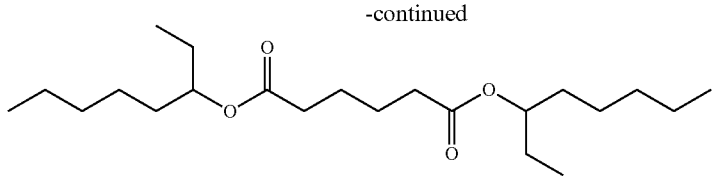
Adimoll DO (di-2-ethylhexyl adipate)

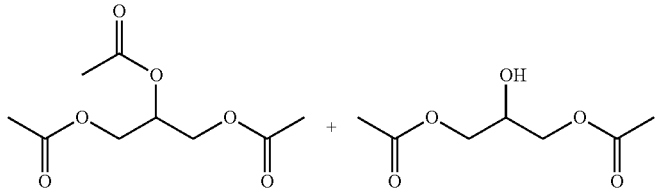
Unimoll AGF (glycerol acetate mixture)

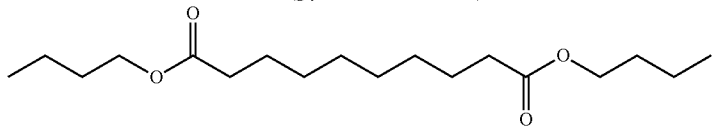
Uniplex DBS (di-n-butyl sebacate)

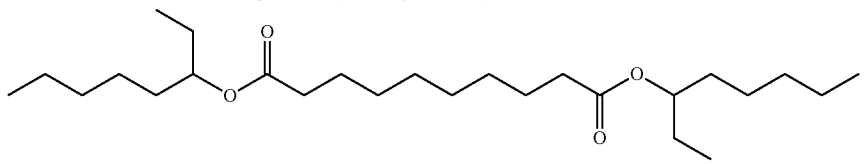
DOS (di-2-ethylhexyl sebacate)

With these additives it is possible to achieve good ink resistance in conjunction with good mounting behaviour. Accordingly, the printing plates adhere reliably to the cylinders or printing sleeves, including the edges; in other words, edge lifting can be prevented.

An especially suitable additive for the purposes of the present invention is stearyl alcohol, particularly when present in an amount of 1 to 15 wt %, preferably 2.5 to 12.5 wt % and more particularly 5 to 10 wt %, based in each case on the overall blend of the at least one adhesive component without solvent. Besides the aforementioned positive properties, PSAs with stearyl alcohol as additive also have very good solvent resistance.

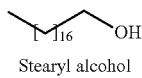
Stearyl alcohol

In one preferred embodiment, the monomer mixture which is the basis for the at least one polymer component of the adhesive component of the pressure-sensitive adhesive of the present invention comprises at least the following monomers
- a) 20 to 99.5 wt % of at least one acrylic ester and/or methacrylic ester whose homopolymer has a static glass transition temperature of <0° C., preferably <−10° C., more particularly <−20° C.;
- b) 0 to 40 wt % of at least one acrylic ester and/or methacrylic ester whose homopolymer has a static glass transition temperature of >0° C., preferably >10° C., more particularly >20° C.;
- c) 0.5 to 20 wt % of acrylic acid and/or methacrylic acid;
- d) 0 to 25 wt % of further copolymerizable monomers, the quantity figures being based in each case on the monomer mixture.

Preferred amounts here are, for component a) 50 to 90 wt % and more particularly 60 to 80 wt %, for component b) 5 to 30 and more particularly 10 to 25 wt %, and for component c) 1 to 15 wt % and more particularly 3 to 12 wt %. The "further copolymerizable monomers" under d) are monomers which do not fall within the definitions according to a) to c).

In one preferred embodiment, the monomer mixture which is the basis for the at least one polymer component of the adhesive component of the pressure-sensitive adhesive of the present invention comprises at least the following monomers:
- i.a) 50-99.5 wt % of at least one acrylic ester and/or methacrylic ester having the following formula:

$CH_2=C(R_1)(COOR_2)$, where $R_1=H$ and $R_2$ is a linear alkyl radical having 2 to 10 carbon atoms or is a branched, non-cyclic alkyl radical having at least 4 carbon atoms, and/or
  $R_1=CH_3$ and $R_2$ is a linear alkyl radical having 8 to 10 carbon atoms or is a branched, non-cyclic alkyl radical having at least 10 carbon atoms;
- i.b) 0 to 40 wt % of at least one acrylic ester and/or methacrylic ester having the following formula:

$CH_2=C(R_3)(COOR_4)$, where $R_3=H$ or $CH_3$ and $R_4$ is a linear alkyl radical having at least 12 carbon atoms, preferably a stearyl radical;
- i.c) 0.5-20 wt % of acrylic acid and/or methacrylic acid;
- i.d) 0-20 wt % of at least one N-alkyl-substituted acrylamide, where the quantity figures are based in each case on the monomer mixture.

An adhesive having at least one polymer component based on a monomer mixture of this kind is especially suitable for the partable fastening of the flexible printing plates, since the printing plates can be fixed reliably and securely using the adhesive, but detachment as well is no problem, even if the printing plates have been cleaned with solvent contaminated by printing ink residues.

Preferred amounts here are, for component i.a) 50 to 90 wt %, more preferably 60 to 80 wt % and more particularly 65 to 75 wt %, for component i.b) 5 to 30 wt %, more preferably 10 to 20 wt % and more particularly 12 to 16 wt %, for component i.c) 0.5 to 15 wt %, more preferably 0.5 to 8 wt % and more particularly 0.5 to 5 wt %, and for component i.d) 5 to 15 and more particularly 7 to 12 wt %.

Selected in particular as monomers of group i.a) are esters of acrylic acid with linear alcohols having 2 to 10 carbon atoms and/or esters of acrylic acid with branched alcohols having at least 4 carbon atoms and/or esters of methacrylic acid with linear alcohols having 8 to 10 carbon atoms and/or esters of methacrylic acid with branched alcohols having at least 10 carbon atoms.

Polymer Component

The polymer component of the PSA of the invention comprises one or more polymers of which at least one and preferably all polymers is/are based on a monomer mixture comprising at least the above-defined monomers i.a) to i.d) (in other words are obtainable from such a monomer mixture by polymerization).

Very preferably, the polymer or polymers forming the polymer component are polymers which are based substantially exclusively on acrylic monomers. Acrylic monomers—also referred to as (meth)acrylic monomers—are understood in the context of this specification to be those monomers which are derivatives of acrylic acid or of methacrylic acid, including the stated acids themselves.

The PSA of the invention is very preferably an adhesive wherein the polymer component is based to an extent of more than 99 wt %, more particularly to an extent of 100 wt %, on (meth)acrylic monomers, more particularly exclusively on those (meth)acrylic monomers meeting definitions i.a) to i.d). The monomer listing given above for the polymers of the PSA of the invention may therefore be—substantially—conclusive, meaning that the monomer mixture for the polymerization of the polymer component comprises not more than 1 wt % of further comonomers, more particularly none, it being the case more particularly that the monomer mixture, apart from the stated monomers i.a) to i.d) contains neither other acrylic monomers nor any other monomers (and therefore consists of the monomers i.a) to i.d)). Where the polymer component comprises more than one polymer, at least one of the polymers, and very preferably all of the polymers, are based preferably to an extent of more than 99 wt %, more preferably exclusively (to an extent of 100 wt %) on a monomer mixture composed of the monomers i.a) to i.d).

In a further embodiment of the PSA of the invention, however, it is also possible for the polymer component to be based on a monomer mixture which in addition to the monomers i.a) to i.d) comprises up to 10 wt %, based on the monomer mixture, of copolymerizable further monomers. Such copolymerizable further monomers in the sense of the group may be, for example, wholly or partially, those having at least one mono- or polyunsaturated carbon-carbon bond and/or, wholly or partially, those having at least one mono- or polyunsaturated carbon-heteroatom bond. The comonomers here may be acrylic monomers (so that the polymer component remains a straight acrylic system; for example, acrylic monomers whose glass transition temperature is greater than 20° C.; particularly if they are selected in such a way (nature and amount relative to component i.a)) that the glass transition temperature of the resulting polymer does not exceed 20° C.) and/or may be non-acrylic monomers.

The monomers of the monomer mixture, especially (meth)acrylic monomers of definitions as per i.a) and/or i.b) and/or any comonomers present, may contain hydroxyl groups; in accordance with the invention, however, it is possible in an outstanding manner to do without the presence of hydroxyl groups in the monomer mixture—and, accordingly, in the resulting polymer component—without this having any adverse effect on the properties of the PSA of the invention.

The advantageous PSA is notable for the fact that aside from the aforementioned functionalities—carboxyl groups, N-alkyl-substituted acrylamides, optionally hydroxyl groups, the latter nevertheless advantageously being omitted—and (meth)acrylic esters, which are preferably not hetero-substituted, there need not be any further functional groups—such as, for example, sulphonic acid groups, lactam groups, lactone groups, N-hetero-substituted amide groups, N-substituted amine groups, carbamate groups, epoxy groups, thiol groups, alcoxy groups, ether groups, cyano groups, halide substituents, to name but a few—on the monomers, meaning that such functional groups do not occur in the resulting polymers either. An advantageous PSA of the invention, therefore, is one whose macromolecules are free from functional groups which are not stated in the definition of the monomers as per groups i.a) to i.d).

The polymers of the polymer component of the advantageous PSA in particular have, advantageously, a number-average molar mass $M_n$ of between 10 000 g/mol and 600 000 g/mol, preferably between 30 000 g/mol and 400 000 g/mol, more preferably between 50 000 g/mol and 300 000 g/mol. Their weight-average molar mass $M_w$ ought preferably to be in a range between 500 000 and 3 000 000 g/mol, more preferably between 800 000 g/mol and 2 200 000 g/mol. In particular the polydispersities $M_w/M_n$ are between 5 and 40.

Figures for molar masses (number-average and weight-average) and polydispersities within this specification are based on determination by gel permeation chromatography. The determination is made on 100 μl of sample having undergone clarifying filtration (sample concentration 4 g/l). The eluent used is tetrahydrofuran with 0.1 vol % of trifluoroacetic acid. Measurement takes place at 25° C. The pre-column used is a column of type PSS-SDV, 5μ, $10^3$ Å, ID 8.0 mm×50 mm. Separation takes place using columns of type PSS-SDV, 5μ, $10^3$ Å and also $10^5$ Å and $10^6$ Å each of ID 8.0 mm×300 mm (columns from Polymer Standards Service; detection using Shodex RI71 differential refractometer). The flow rate is 1.0 ml per minute. Calibration takes place based on PMMA standards (polymethyl methacrylate calibration).

Monomers

Monomers in the sense of group i.a) selected are preferably those monomers whose homopolymer has a glass transition temperature $T_g$ of at most −20° C. These are, in particular, esters of acrylic acid with linear alcohols having 2 to 10 carbon atoms or with branched alcohols having at least 4 carbon atoms, and esters of methacrylic acid with linear alcohols having 8 to 10 carbon atoms or with branched alcohols having at least 10 carbon atoms. Specific examples according to the invention are preferably one or more members selected from the group encompassing n-propyl acrylate, n-butyl acrylate, n-pentyl acrylate, n-hexyl acrylate, n-heptyl acrylate, n-octyl acrylate, n-octyl methacrylate, n-nonyl acrylate, n-nonyl methacrylate, n-decyl acrylate, n-decyl methacrylate, isobutyl acrylate, isopentyl acrylate, isooctyl acrylate, isooctyl methacrylate, the branched isomers of the aforementioned compounds, such as, for example, 2-ethylhexyl acrylate, 2-ethylhexyl methacrylate, 2-propylheptyl acrylate.

Employed as N-alkyl-substituted acrylamide in the sense of the monomer group i.b) are preferably N-n-butylacrylamide, N-sec-butylacrylamide, N-octylacrylamide, N-isopropylacrylamide, N,N-diisopropylacrylamide, N,N-dibutylacrylamide, N,N-dimethylacrylamide and/or N,N-diethylacrylamide, very preferably N-tert-butylacrylamide. The N-alkyl-substituted acrylamides used in accordance with the invention preferably have no other hetero substituents, particularly not on the nitrogen atom.

The monomers of group i.b) are those which in the polymer result in an increased tendency for formation of semicrystalline regions. This behaviour is found for acrylic esters and methacrylic esters having a linear alkyl radical having at least 12 carbon atoms in the alcohol residue, preferably at least 14 carbon atoms in the alcohol residue. In the sense of the monomer group i.b) it is possible with particular advantage, in accordance with the invention, to use stearyl acrylate and/or stearyl methacrylate, for example.

If comonomers are present, they are selected entirely or partially, for example, from the group encompassing vinyl compounds such as vinyl esters, vinyl ethers, vinyl halides, vinylidene halides, vinyl compounds with aromatic rings and heterocycles, especially in α-position to the double bond. Other compounds copolymerizable with acrylic monomers may also be used here, however.

In another preferred embodiment, the monomer mixture which is the basis for the at least one polymer component of the adhesive component of the pressure-sensitive adhesive of the present invention comprises at least the following monomers ii.a) 49.5-89.5 wt % of at least one acrylic ester and/or methacrylic ester and/or their free acids, having the following formula:

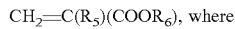

$CH_2=C(R_5)(COOR_6)$, where $R_5=H$ or $CH_3$ and $R_6$ is an alkyl radical having 1 to 10 carbon atoms or H and the homopolymer has a static glass transition temperature of <−30° C.;

ii.b) 10 to 40 wt % of at least one acrylic ester and/or methacrylic ester having the following formula:

$CH_2=C(R_7)(COOR_8)$, where $R_7=H$ or $CH_3$ and $R_8$ is a cyclic alkyl radical having at least 8 carbon atoms or is a linear alkyl radical having at least 12 carbon atoms and the homopolymer has a static glass transition temperature $T_g$ of at least 30° C.;

ii.c) 0.5 to 10 wt % of at least one acrylic ester and/or methacrylic ester and/or their free acids, having the following formula:

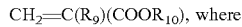

$CH_2=C(R_9)(COOR_{10})$, where $R_9=H$ or $CH_3$ and $R_{10}=H$ or an aliphatic radical having a functional group X, where X comprises COOH, OH, $-NH(R_{11})$, SH, $SO_3H$, and the homopolymer has a static glass transition temperature $T_g$ of at least 30° C., where $R_{11}=H$ or a linear or branched alkyl radical having up to 10 carbon atoms, where the quantity figures are based in each case on the monomer mixture.

(Meth)acrylic monomers which are used very preferably as a component in the sense of ii.a) comprise acrylic and methacrylic esters having alkyl groups consisting of 1 to 10 carbon atoms. Specific examples of such compounds, without wishing to be limited by this recitation, are n-butyl acrylate, n-pentyl acrylate, n-hexyl acrylate, n-heptyl acrylate, n-octyl acrylate, n-nonyl acrylate, 2-ethylhexyl acrylate and isooctyl acrylate.

(Meth)acrylic monomers which are used very preferably as a component in the sense of ii.b) comprise acrylic and methacrylic esters having a cyclic alkyl radical having at least 8 carbon atoms, or having a linear alkyl radical having at least 12 carbon atoms. Specific examples are e.g. n-lauryl acrylate, stearyl acrylate, isobornyl acrylate, isobornyl methacrylate and norbonyl acrylate, this recitation making no claim to completeness.

(Meth)acrylic monomers which are used very preferably as a component in the sense of ii.c) comprise the free acids and also aliphatic radicals with a functional group X, where $X=COOH$, OH, $-NH(R_{11})$, SH, $SO_3H$, where $R_{11}$ is H or a linear or branched alkyl radical having up to 10 carbon atoms. Specific examples of such compounds, without wishing to be limited by this recitation, are hydroxyethyl acrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride and itaconic acid. In a further favourable embodiment, the monomers ii.c) are functionalized such that a thermally initiated crosslinking can be carried out. Crosslinkers which may be selected favourably include the following: epoxides, aziridines, isocyanates, polycarbodiimides and metal chelates, to name but a few.

A preferred characteristic of the copolymers used for the preferred PSA systems is that their molar mass $M_n$ is between about 10 000 and about 600 000 g/mol, preferably between 30 000 and 400 000 g/mol, more preferably between 50 000 g/mol and 300 000 g/mol.

In yet another preferred embodiment, the monomer mixture which is the basis for the at least one polymer component of the adhesive component of the pressure-sensitive adhesive of the present invention comprises at least the following monomers iii.a) 25 to 82 wt % of linear acrylic esters having 2 to 10 carbon atoms in the alkyl radical;

iii.b) 10 to 40 wt % of branched, non-cyclic acrylic esters having a static glass transition temperature $T_g$ of not more than 0° C., preferably not more than −10° C., more particularly not more than −20° C.;

iii.c) 8 to 15 wt % of acrylic acid, based on the total amount of monomers to be polymerized;

iii.d) optionally up to 10 wt % of further copolymerizable monomers, based on the total amount of monomers to be polymerized, where the ratio of the linear acrylic esters to the branched acrylic esters is in the range from 1:6 to 10:1 mass fractions.

Preferred amounts here are, for component iii.a), 50 to 75 and more particularly 55 to 65 wt %, and, for component iii.b), 20 to 40 wt %, more preferably 25 to 35 wt %.

In one particularly preferred embodiment, the PSA comprises only a base polymer component, and with particular advantage the base polymer component is confined to the components iii.a) to iii.c), meaning that the base polymer component is not based on any further copolymerizable monomers other than linear acrylic esters having 2 to 14 carbon atoms in the alkyl radical, branched, non-cyclic acrylic esters having a glass transition temperature $T_g$ of not more than −20° C. and acrylic acid, in the weight fractions stated above.

Linear acrylic esters having 2 to 10 carbon atoms in the alkyl radical are ethyl acrylate, n-propyl acrylate, n-butyl acrylate, n-pentyl acrylate, n-hexyl acrylate, n-heptyl acrylate, n-octyl acrylate, n-nonyl acrylate, n-decyl acrylate.

Branched, non-cyclic acrylic esters having a glass transition temperature $T_g$ (based on the DSC measurement to DIN 53765) of not more than −20° C. are those acrylic esters whose homopolymers have a glass transition temperature $T_g$ of not more than −20° C. Preferred for use as such branched, non-cyclic acrylic esters are C4-C12 alkyl esters of acrylic acid, which are preferably selected from the group consisting of 2-ethylhexyl acrylate (EHA), 2-propylheptyl acrylate, isooctyl acrylate, isobutyl acrylate, isoamyl acrylate and/or isodecyl acrylate. Particular advantage in accordance with the invention has emerged if the branched, non-cyclic acrylic esters used comprise 2-ethylhexyl acrylate (EHA), 2-propylheptyl acrylate and/or isooctyl acrylate (more specifically, the acrylic esters in which the alcohol component derives from a mixture of primary isooctanols, in other words from alcohols which may be obtained from an isoheptene mixture by hydroformylation and subsequent hydrogenation).

Great preference attaches to a PSA whose base polymer derives from precisely one monomer of type iii.a), one monomer of type iii.b) and acrylic acid, with butyl acrylate being selected with particular preference as monomer of type iii.a) and 2-ethylhexyl acrylate as monomer of type iii.b).

With the fraction of acrylic acid in the base polymer component it is possible in an outstanding manner to set the suitability in the desired area of application. As the acrylic acid fraction goes up, there is a fall in quality in mounting behaviour at low temperatures (temperatures below room temperature), but a rise in the quality in terms of edge lifting under influence of solvent (defined below as solvent resistance; quantifiable by means of test method 3: solvent resistance).

An acrylic acid fraction of 7 to 10 wt %, preferably of at least 9 wt %, still shows very good mounting behaviour, and solvent resistance that is already satisfactory, at low temperatures (temperatures below room temperature; here, by way of example, 15° C.). If the acrylic ester fraction is raised to at least 10% while the ratio of linear acrylic ester (by way of example, butyl acrylate) to branched, non-cyclic acrylic ester (by way of example, 2-ethylhexyl acrylate) remains the same, the edge lifting behaviour can be improved further, albeit to the detriment of the mounting behaviour at low temperatures—which, however, remains outstanding at temperatures around room temperature and above. Thus, for example, with 11 wt % of acrylic acid, mounting behaviour at reduced temperatures (15° C., for example) is still satisfactory, and solvent resistance is already good. If less value is placed on the mounting behaviour at low temperatures, then it is possible to observe an outstanding solvent resistance through a further increase in the acrylic acid fraction, for instance to 12 wt % (mounting behaviour at low temperatures still adequate) or to 13 wt % (particularly for mounting at elevated temperatures).

As further copolymerizable monomers for optional use at up to 10 wt %, it is possible, without particular restriction, to use all of the radically polymerizable monomers or monomer mixtures that are known to the skilled person and contain C=C double bonds. Monomers stated by way of example for this purpose are:

methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, t-butylphenyl acrylate, t-butylphenyl methacrylate, dodecyl methacrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxypolyethylene glycol methacrylate 350, methoxypolyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene; macromonomers such as 2-polystyrene-ethyl methacrylate (molar mass Mw of 4000 to 13 000 g/mol), poly(methyl methacrylate)ethyl methacrylate (Mw of 2000 to 8000 g/mol).

The monomers stated by way of example may advantageously also be selected such that they contain functional groups which support subsequent radiation-chemical crosslinking (by means of electron beams, UV, for example).

In the variation of the ratio of linear acrylic ester to branched, non-cyclic acrylic ester it has emerged, furthermore, that a lesser fraction either of linear acrylic ester component or of branched acrylic ester component is unacceptable, since the mounting behaviour at low temperatures is unsatisfactory and does not achieve good values even at room temperature.

The ratio of the linear acrylic esters to the branched acrylic esters is preferably in the range from 1:5 to 9:1, preferably in the range from 1:3 to 5:1, more particularly in the range from 1:2 to 4:1 mass fractions, in order to ensure sufficiently good mounting behaviour at room temperature or higher. With particular preference the ratio selected for the linear acrylic esters to the branched acrylic esters is in the range from 1.5:1 to 3.5:1, more particularly 2:1 to 3:1 mass fractions, since here the best mounting behaviour is found even still at low temperatures (15° C., for example). PSAs of this kind can therefore still be used in an outstanding manner even in the low-temperature range.

The above details (acrylic acid fraction, ratio of the components to one another) are in principle also applicable to the other linear acrylic esters and branched, non-cyclic acrylic esters stated as being advantageous in accordance with the invention.

Crosslinking

In order to obtain the optimum properties of the PSA of the invention, it ought very preferably to be crosslinked.

One method of characterizing the state of crosslinking of a PSA is to determine its shear behaviour. Serving for this purpose, for example, is the determination of the shear strength of layers of the relevant PSA through determination of the maximum micro-shear travel under a temperature load of 40° C.

Data on the micro-shear travel below, as a characteristic of the state of crosslinking of the PSA, are given in relation to the shearing in 15 min at 40° C. of a two-dimensional section measuring to begin with 13 mm×10 mm with a thickness corresponding to a basis weight of 50 g/m², on loading with 1.0 N in the direction of the greater longitudinal extent, in accordance with the method as described in the "Micro-shear travel measurement/state of crosslinking" section of this specification.

The PSA of the invention is especially suitable for use for the bonding of printing plates to printing cylinders and printing sleeves, particularly as a layer of adhesive of an adhesive tape on the side facing the printing cylinder or sleeve (i.e., in contact with these substrates on bonding), when its micro-shear travel, in relation to the reference stated above, is between 100 μm and 300 μm. The best properties for the adhesive of the invention are obtained for a state of crosslinking corresponding to a micro-shear travel, in relation to the reference indicated above, of between 125 μm and 250 μm.

The aforementioned values can be effectively set by using a suitable crosslinker in a well-defined amount, more particularly in the case of a crosslinking reaction which almost completely runs its course.

Through addition of suitable thermal crosslinkers, the PSA of the invention advantageously has thermal crosslinkability, and therefore does not require the addition of actinically activatable crosslinkers, such as crosslinkers activatable by ultraviolet light (UV crosslinkers), for example. Thermal crosslinking may be carried out under conditions which are substantially milder for the PSA, since exposure to the radiation, which also has a destructive effect, can be avoided.

If desired in a particular case, however, it is also possible to bring about crosslinking exclusively or additionally by exposure to actinic radiation, in which case any crosslinker substances useful or required may be added (e.g. UV crosslinkers).

Generally speaking, therefore, the PSA of the invention comprises thermal crosslinkers, these being substances which permit (initiate) and/or promote a crosslinking reaction under the influence of thermal energy.

Adjusting the state of crosslinking—particularly to the preferred ranges specified above—may be done, for example, by the use of covalently reacting crosslinkers, more particularly epoxides, isocyanates and/or aziridines, and/or through the use of coordinative crosslinkers, more particularly metal chelates, preferably aluminium chelate.

Metal chelates, such as aluminium chelates in particular, in the form of aluminium(III) acetylacetonate, for example, are used for achieving the above-specified state of crosslinking preferably in an amount of 0.15 to 0.35 part by weight, more preferably of 0.2 to 0.3 part by weight, based in each case on 100 parts by weight of the polymer component (solvent-free).

Examples of other very suitable thermal crosslinkers are epoxides containing tertiary amine functions, such as, in particular, tetraglycidyl-meta-xylenediamine (N,N,N',N'-tetrakis(oxiranylmethyl)-1,3-benzenedimethanamine). These compounds are used preferably in an amount of 0.03 to 0.1 part by weight, more preferably of 0.04 to 0.07 part by weight, for example 0.06 part by weight, in turn based in each case on 100 parts by weight of the polymer component (solvent-free), in order to achieve the state of crosslinking defined above.

Crosslinking advantageously takes place such that the crosslinking reaction as far as possible runs its entire course. For this purpose it is useful if at least 85 wt %, preferably at least 90 wt %, of the crosslinker is converted during the crosslinking reaction. At such a conversion of the crosslinking reaction, it has been possible in each case to realize the above-defined state of crosslinking of the PSA.

A crosslinked PSA is prepared by first using radical polymerization to prepare a polymer component from a monomer mixture comprising the monomers a) to d) or i.a) to i.d) or ii.a) ii.c) or iii.a) to iii.d); during or, preferably, after the polymerization, at least one thermal crosslinker, more particularly one or more of the crosslinkers set out above, very preferably aluminium(III) acetylacetonate or tetraglycidyl-meta-xylenediamine, is added, more particularly in the respective amounts specified above; optionally further polymer components based on a monomer mixture comprising the monomers, and also the additives of the invention and/or any further (standard) additives, are admixed to the polymer component; and the PSA mixed with the crosslinker is crosslinked, by supply of thermal energy, to an extent such that its state of crosslinking corresponds to a micro-shear travel in the range from 100 μm to 300 μm, preferably in the range from 125 μm to 250 μm (for reference see above).

Admixtures

In a preferred way, the polymer component as such—without substantial fractions of other constituents—is already pressure-sensitively adhesive. In one advantageous embodiment of the invention, the polymer component or polymer components based on monomer mixtures comprising the monomers a) to d) or i.a) to i.d) or ii.a) to ii.c) or iii.a) to iii.d) make(s) up at least 90 wt %, preferably at least 95 wt %, more preferably at least 98 wt %, very preferably more than 99.9 wt % of the PSA. A figure of 100 wt % is very preferred.

As a concomitant of their production, however, PSAs typically comprise a small fraction of impurities, unconverted monomers or the like.

Given an appropriate choice of the monomers, as defined by the monomers a) to d) or i.a) to i.d) or ii.a) to ii.c) or iii.a) to iii.d) and, optionally, further comonomers, the PSA of the invention can be used resin-free and/or—disregarding the presence or absence of crosslinkers (see above)—free from other standard (i.e. non-inventive) additives.

In order to fine-tune the pressure-sensitive adhesion properties, or as contributory components to a crosslinking or curing reaction, resins are frequently admixed to PSAs (tackifying resins, reactive resins). Conversely, the PSA of the invention may be realized in an outstanding manner without the admixing of resins, without this having any deleterious effect on its suitability for the stated purpose. In this context, tackifying resins, thermoplastic resins, and reactive resins may be omitted. In particular, the absence of resins leads to a particularly residue-free substrate surface after demounting of the adhesive tape, for example to particularly residue-free printing cylinders or printing sleeves, after the pressure-sensitive adhesive tape of the invention, previously bonded, has been removed again.

Resins are considered for the purposes of this specification to comprise, in particular, those oligomeric and (lower) polymeric compounds whose number-average molar mass $M_n$ is not more than 5000 g/mol. Of course, short-chain polymerization products which come about during the polymerization of the above-defined monomer mixture for preparing the polymer component of the PSA of the invention are not subsumed by the term "resins".

Tackifying resins—also referred to as tackifier resins—frequently have softening points in the range from 80 to 150° C., without any wish that this span should be imposed on the definition. The figures for the softening point $T_s$ of oligomeric and polymeric compounds, such as of the resins, relate to the ring & ball method of DIN EN 1427:2007 with appropriate application of the provisions (analysis of the oligomer sample or polymer sample instead of bitumen, with the procedure otherwise retained). The measurements are made in a glycerol bath. Those resins which can be omitted for the PSA of the invention are, for example, natural and/or synthetic resins, such as pinene resins and indene resins, rosin and derivatives of rosin (rosin esters, including rosin derivatives stabilized by disproportion or hydrogenation, for example), polyterpene resins, terpene-phenolic resins, alkylphenolic resins, aliphatic, aromatic, and aliphatic-aromatic hydrocarbon resins, to name but a few.

Reactive resins are those resins which have functional groups such that they would be able, given appropriate activation, to react with further constituents of the PSA—such as the macromolecules of the polymer components or other reactive resins, for example.

In order to optimize the PSA of the invention, moreover, the standard additives familiar in each case to the skilled person for the particular purpose may be added. An advantage of the PSA of the invention, however, is that in particular even in standard additive-free form—leaving aside the crosslinkers which are discussed separately—it is outstandingly suitable for the intended application given. It is therefore possible to omit further standard additives—leaving aside the presence or absence of crosslinkers—without this having disadvantageous consequences for the advantageous properties of the PSA. Hence it is possible in particular to omit the admixing of standard additives such as plasticizers, filling materials, functional adjuvants for obtaining particular physical properties (such as electrically conductive filling materials, thermally conductive filling materials, and the like), flame retardants (such as ammonium polyphosphate and its derivatives, for example), and the like.

Use

The PSA of the invention is suitable for reliable bonding on common materials and is notable for good residue-free redetachability. It exhibits this behaviour in particular even for very polar substrates, from which prior-art adhesives, especially after a prolonged period of bonding, can generally not be parted again without leaving residues.

Very good reversibility, i.e., residue-free redetachability, has been found even for substrates whose surface energy is 45 mN/m or more, in particular even for materials having surface energies in the region of 48 mN/m or more, such as steel, for example, which according to literature figures has the value of 50 mN/m.

The invention further provides the use of the PSA of the invention as a layer of adhesive for pressure-sensitive adhesive tapes, more particularly for double-sided pressure-sensitive adhesive tapes, and also the corresponding pressure-sensitive adhesive tapes comprising a layer of the PSA of the invention. Such adhesive tapes may be equipped in particular with a carrier, optionally further layers and two outer layers of adhesive, which in turn may be provided temporarily—for more convenient handling, storage, and presentation—on one or both PSA layers with a temporary lining material, or liner. With such adhesive tapes equipped with pressure-sensitive adhesion on both sides, both layers of adhesive may be formed from the PSA of the invention—and may be identical in particular in their composition and/or thickness and/or state of crosslinking—or else one of the layers of adhesive may be realized by a PSA of the invention, while the other layer of adhesive is selected from a different PSA, which may be geared optimally to the substrate to be bonded accordingly. Suitable carrier materials for the pressure-sensitive adhesive tapes are the films customary and familiar to the skilled person, such as, for example, polyesters, polyethylene terephthalate (PET), polyethylene (PE), polypropylene (PP), biaxially oriented polypropylene (BOPP), monoaxially oriented polypropylene (MOPP), polyurethane (PU), polyvinyl chloride (PVC) and so on, it also being possible for these materials to be used in each case as a foamed layer.

Attention is drawn to the fact that the PSA of the invention may also be used as a layer of adhesive on other adhesive tapes, examples being single-layer, carrier-less adhesive tapes ("adhesive transfer tapes"), which consist of the layer of adhesive.

The PSA of the invention may be used in an outstanding manner for bonding flexible printing plates to curved surfaces, particularly on printing plates, more particularly as a layer of adhesive in a pressure-sensitive adhesive tape. The particular suitability of the PSA of the invention for reversible bonding to plastics material (see above) makes it particularly suitable for bonding to printing plates made from that material. Since the adhesive also possesses good properties on other materials, the pressure-sensitive adhesive tapes in question may be used very flexibly, including in their use in flexographic printing. Thus the PSA of the invention may be employed as a layer of adhesive on double-sided pressure-sensitive adhesive tapes, with the PSA of the invention representing the layer of adhesive facing the printing plate during bonding. Use is made in particular of double-sided pressure-sensitive adhesive tapes of the kind described above. The carrier material used in this case is advantageously a foamed sheetlike structure—for example, a polymer foam layer. Hence it is possible in particular to use foamed polyolefins such as polyethylene and polypropylene; particular preference is given to a polyethylene/ethylene-vinyl acetate foam. Moreover, for example, foamed polyurethanes or foamed polyvinyl chlorides may be employed. Generally speaking, the carrier material may be roughened to improve the anchoring of the PSA. One way of roughening and of chemically modifying the polymer structure involves wet-chemical etching of the carrier material. Besides etching, there are other possible pretreatments. Thus, for the purpose of improving the anchoring, the carrier materials may be pretreated physically and chemically. For the physical treatment, the film is treated preferably by flame or corona or plasma. For the chemical pretreatment, the carrier material is given an undercoat, and in one particularly preferred version, reactive undercoats are used. Suitable undercoat materials include, for example, reactive primers.

The construction of such an adhesive tape of the invention corresponds in one very preferred embodiment to a layer sequence as reproduced in FIG. 1. In that case the PSA of the invention is used with particular preference as layer 9 of adhesive, in other words the layer of adhesive facing the printing cylinder or printing sleeve in application, since the PSA is optimized for this intended use.

By virtue of the broad utility spectrum of the PSA of the invention, it is also suitable for the adhesive layer which is in contact with the printing plate.

The adhesive tape of the invention serves advantageously to bond a printing plate which is composed of a PET film 2 and a layer of a photopolymer 1.

Layers 3 to 9 form a double-sidedly adhesive plate-mounting tape of the invention, which by virtue of its foamed carrier 8 is compressible and elastic.

Figure 2:
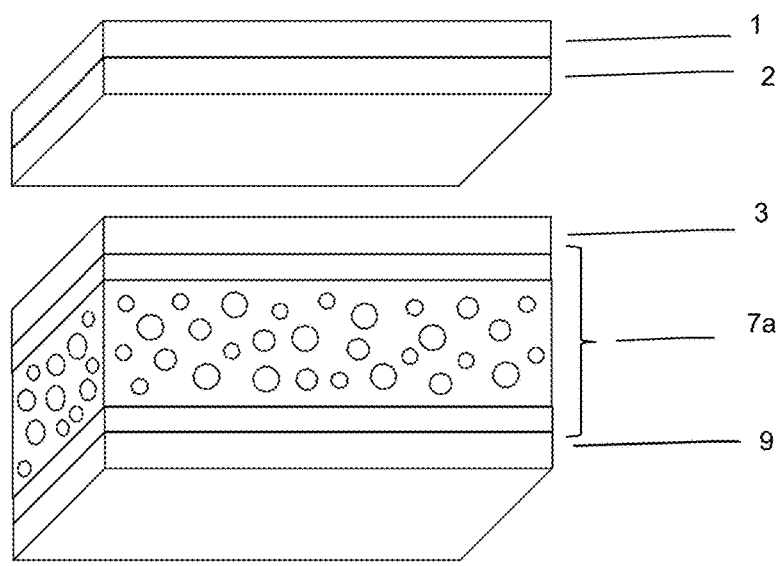
FIG. 2 illustrates an alternative construction of the adhesive tape of the invention.

Beginning from the side by means of which the printing plate is bonded, the adhesive tape consists of the following individual sections:

3 PSA for mounting the plate
4 the roughened upper surface of the PET film 5
5 film of polyethylene terephthalate (PET)
6 the roughened lower surface of the PET film 5
7 PSA for anchoring the foamed carrier 8 on the PET film 5
8 foamed carrier
9 PSA for mounting on the printing cylinder An alternative adhesive tape construction is shown in FIG. 2. The adhesive tape there consists of the following sections:

3 PSA for mounting the plate
7a assembly of foamed carrier and PE film fused onto the surface on both sides
9 PSA for mounting on the printing cylinder In the printing industry especially it is important that the adhesive tapes employed here have a high flexibility, i.e., are able to alter their thickness to a certain extent when pressure is applied, and to regain their original form when the load has been removed.

For this reason, in a further advantageous embodiment of the double-sidedly adhesive tape, there is a foamed carrier present between the polyethylene terephthalate (PET) film and at least one adhesive, more particularly between the adhesive facing the printing cylinder or sleeve, and the polyethylene terephthalate (PET) film, where the adhesive tape is used in the printing industry.

It is advantageous, furthermore, if the foamed carrier 8 consists of polyolefin(s), polyvinyl chloride or polyurethane. One particularly preferred embodiment uses foamed polyethylenes and/or polypropylenes. It is further preferred if the surfaces of the foamed carrier 8 have been physically pretreated, the physical pretreatment method being selected in particular from the group consisting of corona pretreatment, flame pretreatment, or plasma treatment.

The physical pretreatment technique commonly referred to as "corona pretreatment" is usually a "dielectric barrier discharge" (DBD) wherein high-voltage discharges are generated by means of high-frequency alternating voltage. The substrate for treatment is passed in the form of a web between two high-voltage electrodes, with at least one electrode consisting of or having been coated with a dielectric material. The material for treatment is exposed directly to the electrical discharges, or at least to the reactive gas generated by the discharges. The electrical discharges are often referred to as "corona discharges".

Corona pretreatment as a method for the surface pretreatment of carriers is much in use industrially. Serving as a process gas, typically, is the ambient air. The use of process gases other than air, such as nitrogen, carbon dioxide, or noble gases, for example, is likewise known prior art.

Alternatively, the surface of the PSA layer 9 that faces the carrier may be physically pretreated, more particularly by corona pretreatment, flame pretreatment or plasma treatment, in order to improve the strength of the bond between the PSA layer and the carrier. Physical treatment of the PSA may likewise be carried out advantageously in air as process gas, although process gases used may be, for example, nitrogen, carbon dioxide, or noble gases. Nitrogen or a mixture of air and nitrogen, for example, have been found to be advantageous.

For increasing the peel adhesion between the PSA layer 9 and the foamed carrier 8 it has emerged, surprisingly, as being particularly advantageous if not only the PSA layer 9 but also the foamed carrier 8 are pretreated physically before being brought together on their sides respectively facing one another when assembled, more particularly by one of the aforementioned physical methods. In this case the pretreatment methods for the two layers may be selected independently of one another, but preferably they are pretreated by the same method, more preferably by means of corona pretreatment. By pretreatment of both layers, especially by corona pretreatment, the internal strength of the bond is significantly improved, and any residues of the adhesive tape—already a small quantity when using the PSA of the invention—remaining on demounting from its substrate (such as a printing cylinder or printing sleeve, for instance) may be perceptibly reduced even further.

In principle, then, it is surprising to the skilled person that through the treatment of a surface of adhesive by a physical method it is possible to achieve an increase in the peel adhesion. The skilled person expects all of these methods to be accompanied by chain breaks and a degradation of material, and so the expectation would be that a layer would be formed having a high level of polar groups, but a low internal cohesion. As a result of the weakly cohesive layer with increased polarity, improved wetting of the substrate by the adhesive is not surprising, but reduced adhesion properties will be expected.

The treatment intensity of corona pretreatment is reported as the "dose" in $[W*min/m^2]$, with the dose $D=P/(b*v)$, where P=electrical power [W], b=electrode width [m], and v=belt speed [m/min].

Corona pretreatment takes place preferably at a dose of 1 to 150 $W*min/m^2$. Particularly preferred for the layer of PSA is a dose of 10 to 100 $W*min/m^2$, more particularly a dose of 40 to 60 $W*min/m^2$. For the foam carrier layer, higher doses are preferably used—for instance, here, a dose of 50 to 150 $W*min/m^2$, and more particularly a dose of 80 to 120 $W*min/m^2$, are very advantageous.

The film of polyethylene terephthalate (PET) preferably has a thickness of 5 μm to 500 μm, more preferably 5 μm to 60 μm; especially preferred are 12 μm and 23 μm.

Besides the product construction shown in FIG. 1, the stabilizing film may also consist of polyolefins, polyurethanes, or polyvinyl chloride, and in addition to the etching it may also have been pretreated in a variety of ways. For instance, the stabilizing films here may also be pretreated physically and chemically in order to improve anchoring. For the physical treatment, the film is treated preferably by flame or corona or plasma. For the chemical pretreatment, the film is given an undercoat, with reactive undercoats being used in one particularly preferred embodiment. Examples of suitable undercoat materials include reactive primers. Furthermore, alternatively or additionally to the film layer, the adjacent layers of adhesive may also have been pretreated here, corresponding in particular to the above-described layer 9 of adhesive.

In a further preferred version, the stabilizing film of polyethylene terephthalate or another material is printed on one or both sides. This printing may lie beneath a PSA for subsequent application.

For the PSAs 7 it is likewise possible, for example, to use an acrylate PSA, although in principle other types of adhesive can also be used.

Furthermore, the adhesive tape of the invention may be provided on one or both sides with a liner composed of paper or a corresponding film—in particular one that is double-sidedly siliconized—in order to ensure longer storage and convenient handling during use.

The other adhesive tape designs as known from the prior art, particularly for the bonding of printing plates to printing cylinders or sleeves, may also be realized in accordance with the invention, however, with at least the layer of adhesive for bonding to the cylinder or sleeve, in particular, being realized through the PSA of the invention.

On account of its special properties, the double-sidedly adhesive tape of the invention may be used in an outstanding manner for the fastening of printing plates, especially of photopolymer printing plates, and especially their multilayer forms, to printing cylinders and to printing sleeves.

By virtue of its special design, particularly with the peel adhesion geared to the printing plate, the adhesive tape of the invention is outstandingly suitable for bonding the printing plates to the printing cylinders. On the one hand it is possible to reposition the printing plates before printing begins; on the other hand, however, firm bonding of the plate is ensured during the printing process. Even a printing plate soiled with ink residues can be removed from the pressure-sensitive adhesive tape without any damage at all. Peeling of the carrier layer of the plate, or the formation of unwanted creases in the plate during removal, do not occur. After the removal of the adhesive tape from the printing cylinder, no residues are left, either.

Figure 3:
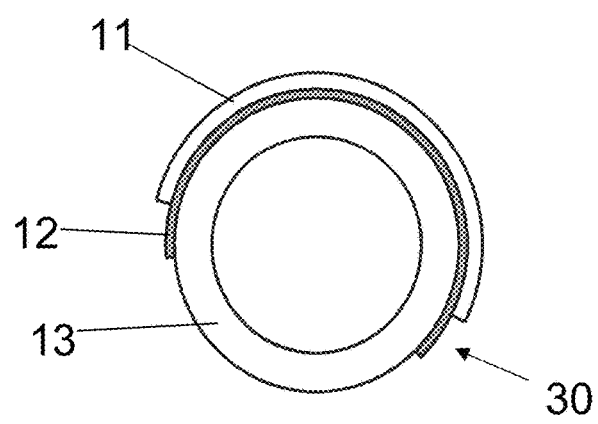
FIG. 3 illustrates the bonding of a printing plate to a printing cylinder or printing sleeve.
Figure 4:
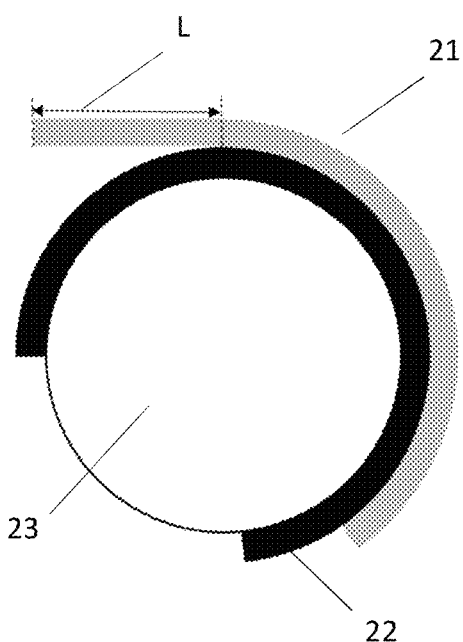
FIG. 4 illustrates the detachment of one edge of a printing plate from the bonded assembly.

Printing plates are bonded to printing cylinders and printing sleeves in a variety of ways. Common methods are shown by FIGS. 2, 3 and 4:

According to FIG. 3, the plate (11) is bonded to the printing sleeve (13) or printing cylinder (13) by means of an adhesive tape (12) which is larger than the plate (11) and therefore projects by exposed regions (20) beneath the plate (11).

These forms of application are shown here merely by way of example, without any intention that they should thereby restrict the teaching according to the invention.

The adhesive tapes of the invention exhibit very good mounting characteristics. Mounting characteristics in the sense of the present specification are understood in particular as the instantaneous adhesion during the bonding of an adhesive tape to a substrate, by means of the pressure-sensitive adhesive layer in question; for good mounting characteristics, therefore, brief applied pressure at low force ought, accordingly, to lead to effective and reliable adhesion.

The PSAs of the invention meet the requirements for simple mounting, repositionability, secure hold even, in particular, on polar substrates and under the influence of solvent. Moreover, they are notable for simple and residue-free demountability. They are suitable in particular for application in flexographic printing, as set out above.

Experiments

The pressure-sensitive adhesives (PSAs) investigated (inventive examples and reference examples) were produced as follows unless otherwise stated:

Acrylate PSAs

A 2 L glass reactor conventional for radical polymerizations was charged with 400 g of the monomer mixture in accordance with the composition as set out for the individual examples in Table 1, 150 g of acetone and 150 g of special-boiling-point spirit 60/95, the initial charge being thoroughly mixed. After nitrogen gas had been passed through the reactor for 45 minutes, with stirring, an external heating bath was used to heat the reactor to 58° C. (internal temperature) and 0.16 g of 2,2'-azodi(2-methylbutyronitrile) (Vazo 67) in solution in 10 g of acetone was added. Thereafter the external heating bath was heated to 75° C. and the reaction was carried out constantly with evaporative cooling (external temperature 75° C.). After a reaction time of one hour a further 0.24 g of 2,2'azodi(2-methylbutyronitrile) in solution in 10 g of acetone was added. After a total reaction time of 3 hours, dilution took place with 45 g of acetone and 45 g of special-boiling-point spirit 60/95. After a total reaction time of 5 hours and 30 minutes, 0.60 g of bis-(4-tert-butylcyclohexanyl) peroxydicarbonate in solution in 10 g of acetone was added. After a total reaction time of 7 hours a further 0.60 g of bis-(4-tert-butylcyclohexanyl) peroxydicarbonate in solution in 10 g of acetone was added. After a total reaction time of 10 hours, dilution took place with 45 g of acetone and 45 g of special-boiling-point spirit 60/95. After a total reaction time of 24 hours, reaction was discontinued and cooling took place to room temperature.

TABLE 1

PSA for carrying out the measurement series, inventive examples and comparative examples

| | | Polymer composition (wt %) * | | | | | | Amount of additive | |
|---|---|---|---|---|---|---|---|---|---|
| | | n-BA | NtBAM | StAc | AA | 2-EHA | Additive | (wt %)** | Crosslinker [g] |
| V1 | comparative | 29 | | | 12 | 59 | | | 0.80 Uvacure 1500 |
| V2 | comparative | 29 | | | 12 | 59 | Ethomeen C25 | 3.8 | 0.80 Uvacure 1500 |
| V3 | comparative | 72 | 10 | 15 | 3 | | | | 0.24 Erisys GA 240 |

TABLE 1-continued

PSA for carrying out the measurement series, inventive examples and comparative examples

| | | Polymer composition (wt %) * | | | | | | Amount of additive | |
|---|---|---|---|---|---|---|---|---|---|
| | | n-BA | NtBAM | StAc | AA | 2-EHA | Additive | (wt %)** | Crosslinker [g] |
| B0a | comparative | 72 | 10 | 15 | 3 | | triacetin | 5 | 0.24 Erisys GA 240 |
| B0b | comparative | 72 | 10 | 15 | 3 | | triacetin | 10 | 0.24 Erisys GA 240 |
| B0c | comparative | 72 | 10 | 15 | 3 | | triacetin | 15 | 0.24 Erisys GA 240 |
| B0d | comparative | 72 | 10 | 15 | 3 | | diacetin | 15 | 0.24 Erisys GA 240 |
| B0e | comparative | 72 | 10 | 15 | 3 | | acetic acid | 15 | 0.24 Erisys GA 240 |
| B0f | comparative | 72 | 10 | 15 | 3 | | glycerol | 15 | 0.24 Erisys GA 240 |
| B1a | inventive | 72 | 10 | 15 | 3 | | camphor | 5 | 0.24 Erisys GA 240 |
| B1b | comparative | 72 | 10 | 15 | 3 | | camphor | 10 | 0.24 Erisys GA 240 |
| B1c | comparative | 72 | 10 | 15 | 3 | | camphor | 15 | 0.24 Erisys GA 240 |
| B2a | comparative | 72 | 10 | 15 | 3 | | Ethomeen C25 | 5 | 0.24 Erisys GA 240 |
| B2b | inventive | 72 | 10 | 15 | 3 | | Ethomeen C25 | 10 | 0.24 Erisys GA 240 |
| B2c | inventive | 72 | 10 | 15 | 3 | | Ethomeen C25 | 15 | 0.24 Erisys GA 240 |
| B2d | inventive | 72 | 10 | 15 | 3 | | Ethomeen C25 | 20 | 0.24 Erisys GA 240 |
| B2e | inventive | 72 | 10 | 15 | 3 | | Ethomeen C25 | 25 | 0.24 Erisys GA 240 |
| B3a | comparative | 72 | 10 | 15 | 3 | | Ethoduomeen T25 | 5 | 0.24 Erisys GA 240 |
| B3b | inventive | 72 | 10 | 15 | 3 | | Ethoduomeen T25 | 10 | 0.24 Erisys GA 240 |
| B3c | inventive | 72 | 10 | 15 | 3 | | Ethoduomeen T25 | 15 | 0.24 Erisys GA 240 |
| B3d | inventive | 72 | 10 | 15 | 3 | | Ethoduomeen T25 | 20 | 0.24 Erisys GA 240 |
| B3e | inventive | 72 | 10 | 15 | 3 | | Ethoduomeen T25 | 25 | 0.24 Erisys GA 240 |
| B4a | Comparative | 72 | 10 | 15 | 3 | | Genamin O200 | 5 | 0.24 Erisys GA 240 |
| B4b | inventive | 72 | 10 | 15 | 3 | | Genamin O200 | 10 | 0.24 Erisys GA 240 |
| B4c | inventive | 72 | 10 | 15 | 3 | | Genamin O200 | 15 | 0.24 Erisys GA 240 |
| B4d | inventive | 72 | 10 | 15 | 3 | | Genamin O200 | 20 | 0.24 Erisys GA 240 |
| B4e | inventive | 72 | 10 | 15 | 3 | | Genamin O200 | 25 | 0.24 Erisys GA 240 |
| B5a | comparative | 72 | 10 | 15 | 3 | | Adimoll BO | 5 | 0.24 Erisys GA 240 |
| B5b | inventive | 72 | 10 | 15 | 3 | | Adimoll BO | 10 | 0.24 Erisys GA 240 |
| B5c | inventive | 72 | 10 | 15 | 3 | | Adimoll BO | 12.5 | 0.24 Erisys GA 240 |
| B5d | inventive | 72 | 10 | 15 | 3 | | Adimoll BO | 15 | 0.24 Erisys GA 240 |
| B5e | inventive | 72 | 10 | 15 | 3 | | Adimoll BO | 17.5 | 0.24 Erisys GA 240 |
| B5f | inventive | 72 | 10 | 15 | 3 | | Adimoll BO | 20 | 0.24 Erisys GA 240 |
| B5g | inventive | 72 | 10 | 15 | 3 | | Adimoll BO | 25 | 0.24 Erisys GA 240 |
| B6a | comparative | 72 | 10 | 15 | 3 | | Adimoll DB | 5 | 0.24 Erisys GA 240 |
| B6b | inventive | 72 | 10 | 15 | 3 | | Adimoll DB | 10 | 0.24 Erisys GA 240 |
| B6c | inventive | 72 | 10 | 15 | 3 | | Adimoll DB | 15 | 0.24 Erisys GA 240 |
| B6d | inventive | 72 | 10 | 15 | 3 | | Adimoll DB | 20 | 0.24 Erisys GA 240 |
| B6e | inventive | 72 | 10 | 15 | 3 | | Adimoll DB | 25 | 0.24 Erisys GA 240 |
| B7a | comparative | 72 | 10 | 15 | 3 | | Adimoll DO | 5 | 0.24 Erisys GA 240 |
| B7b | inventive | 72 | 10 | 15 | 3 | | Adimoll DO | 10 | 0.24 Erisys GA 240 |
| B7c | inventive | 72 | 10 | 15 | 3 | | Adimoll DO | 15 | 0.24 Erisys GA 240 |
| B7d | inventive | 72 | 10 | 15 | 3 | | Adimoll DO | 20 | 0.24 Erisys GA 240 |
| B7e | inventive | 72 | 10 | 15 | 3 | | Adimoll DO | 25 | 0.24 Erisys GA 240 |
| B8a | comparative | 72 | 10 | 15 | 3 | | Unimoll AGF | 5 | 0.24 Erisys GA 240 |
| B8b | comparative | 72 | 10 | 15 | 3 | | Unimoll AGF | 10 | 0.24 Erisys GA 240 |
| B8c | inventive | 72 | 10 | 15 | 3 | | Unimoll AGF | 12.5 | 0.24 Erisys GA 240 |
| B8d | inventive | 72 | 10 | 15 | 3 | | Unimoll AGF | 15 | 0.24 Erisys GA 240 |
| B8e | inventive | 72 | 10 | 15 | 3 | | Unimoll AGF | 17.5 | 0.24 Erisys GA 240 |
| B8f | inventive | 72 | 10 | 15 | 3 | | Unimoll AGF | 20 | 0.18 Erisys GA 240 |
| B8g | inventive | 72 | 10 | 15 | 3 | | Unimoll AGF | 25 | 0.24 Erisys GA 240 |
| B9a | comparative | 72 | 10 | 15 | 3 | | Uniplex DBS | 5 | 0.18 Erisys GA 240 |
| B9b | inventive | 72 | 10 | 15 | 3 | | Uniplex DBS | 10 | 0.24 Erisys GA 240 |
| B9c | inventive | 72 | 10 | 15 | 3 | | Uniplex DBS | 15 | 0.24 Erisys GA 240 |
| B9d | inventive | 72 | 10 | 15 | 3 | | Uniplex DBS | 20 | 0.24 Erisys GA 240 |
| B10a | comparative | 72 | 10 | 15 | 3 | | DOS | 5 | 0.24 Erisys GA 240 |
| B10b | inventive | 72 | 10 | 15 | 3 | | DOS | 10 | 0.24 Erisys GA 240 |
| B10c | inventive | 72 | 10 | 15 | 3 | | DOS | 15 | 0.24 Erisys GA 240 |
| B10d | inventive | 72 | 10 | 15 | 3 | | DOS | 20 | 0.24 Erisys GA 240 |
| B10e | inventive | 72 | 10 | 15 | 3 | | DOS | 25 | 0.24 Erisys GA 240 |
| B11a | comparative | 72 | 10 | 15 | 3 | | stearyl alcohol | 2.5 | 0.24 Erisys GA 240 |
| B11b | inventive | 72 | 10 | 15 | 3 | | stearyl alcohol | 5 | 0.24 Erisys GA 240 |
| B11c | inventive | 72 | 10 | 15 | 3 | | stearyl alcohol | 7.5 | 0.24 Erisys GA 240 |
| B11d | inventive | 72 | 10 | 15 | 3 | | stearyl alcohol | 10 | 0.24 Erisys GA 240 |
| B11e | comparative | 72 | 10 | 15 | 3 | | stearyl alcohol | 12.5 | 0.24 Erisys GA 240 |
| B12a | comparative | 72 | 10 | 15 | 3 | | DCHP | 15 | 0.24 Erisys GA 240 |
| B12b | comparative | 72 | 10 | 15 | 3 | | Palatinol M | 15 | 0.24 Erisys GA 240 |
| B12c | comparative | 72 | 10 | 15 | 3 | | Ultramoll M | 15 | 0.24 Erisys GA 240 |
| B12d | comparative | 72 | 10 | 15 | 3 | | Plastomoll DNA | 15 | 0.24 Erisys GA 240 |
| B12e | comparative | 72 | 10 | 15 | 3 | | Ultramoll M NV | 15 | 0.24 Erisys GA 240 |
| B12f | comparative | 72 | 10 | 15 | 3 | | Hexamoll DINCH | 15 | 0.24 Erisys GA 240 |
| B12g | comparative | 72 | 10 | 15 | 3 | | Plaxter B271 | 15 | 0.24 Erisys GA 240 |
| C0a | comparative | 29 | | | 12 | 59 | triacetin | 5 | 0.8 Uvacure 1500 |
| C0b | comparative | 29 | | | 12 | 59 | triacetin | 10 | 0.8 Uvacure 1500 |
| C0c | comparative | 29 | | | 12 | 59 | triacetin | 15 | 0.8 Uvacure 1500 |
| C0d | comparative | 29 | | | 12 | 59 | diacetin | 15 | 0.8 Uvacure 1500 |

TABLE 1-continued

PSA for carrying out the measurement series, inventive examples and comparative examples

| | | Polymer composition (wt %) * | | | | | | Amount of additive | | |
|---|---|---|---|---|---|---|---|---|---|---|
| | | n-BA | NtBAM | StAc | AA | 2-EHA | Additive | (wt %)** | | Crosslinker [g] |
| C0e | comparative | 29 | | | 12 | 59 | acetic acid | 15 | 0.8 | Uvacure 1500 |
| C0f | comparative | 29 | | | 12 | 59 | glycerol | 15 | 0.8 | Uvacure 1500 |
| C1a | comparative | 29 | | | 12 | 59 | camphor | 5 | 0.8 | Uvacure 1500 |
| C1b | comparative | 29 | | | 12 | 59 | camphor | 10 | 0.8 | Uvacure 1500 |
| C1c | comparative | 29 | | | 12 | 59 | camphor | 15 | 0.8 | Uvacure 1500 |
| C2a | comparative | 29 | | | 12 | 59 | Ethomeen C25 | 5 | 0.8 | Uvacure 1500 |
| C2b | inventive | 29 | | | 12 | 59 | Ethomeen C25 | 10 | 0.8 | Uvacure 1500 |
| C2c | inventive | 29 | | | 12 | 59 | Ethomeen C25 | 15 | 0.8 | Uvacure 1500 |
| C2d | inventive | 29 | | | 12 | 59 | Ethomeen C25 | 20 | 0.8 | Uvacure 1500 |
| C2e | inventive | 29 | | | 12 | 59 | Ethomeen C25 | 25 | 0.8 | Uvacure 1500 |
| C3a | comparative | 29 | | | 12 | 59 | Ethoduomeen T25 | 5 | 0.8 | Uvacure 1500 |
| C3b | inventive | 29 | | | 12 | 59 | Ethoduomeen T25 | 10 | 0.8 | Uvacure 1500 |
| C3c | inventive | 29 | | | 12 | 59 | Ethoduomeen T25 | 15 | 0.8 | Uvacure 1500 |
| C3d | inventive | 29 | | | 12 | 59 | Ethoduomeen T25 | 20 | 0.8 | Uvacure 1500 |
| C3e | inventive | 29 | | | 12 | 59 | Ethoduomeen T25 | 25 | 0.8 | Uvacure 1500 |
| C4a | comparative | 29 | | | 12 | 59 | Genamin O200 | 5 | 0.8 | Uvacure 1500 |
| C4b | inventive | 29 | | | 12 | 59 | Genamin O200 | 10 | 0.8 | Uvacure 1500 |
| C4c | inventive | 29 | | | 12 | 59 | Genamin O200 | 15 | 0.8 | Uvacure 1500 |
| C4d | inventive | 29 | | | 12 | 59 | Genamin O200 | 20 | 0.8 | Uvacure 1500 |
| C4e | inventive | 29 | | | 12 | 59 | Genamin O200 | 25 | 0.8 | Uvacure 1500 |
| C5a | comparative | 29 | | | 12 | 59 | Adimoll BO | 5 | 0.8 | Uvacure 1500 |
| C5b | inventive | 29 | | | 12 | 59 | Adimoll BO | 10 | 0.8 | Uvacure 1500 |
| C5c | inventive | 29 | | | 12 | 59 | Adimoll BO | 12.5 | 0.8 | Uvacure 1500 |
| C5d | inventive | 29 | | | 12 | 59 | Adimoll BO | 15 | 0.8 | Uvacure 1500 |
| C5e | inventive | 29 | | | 12 | 59 | Adimoll BO | 17.5 | 0.8 | Uvacure 1500 |
| C5f | inventive | 29 | | | 12 | 59 | Adimoll BO | 20 | 0.8 | Uvacure 1500 |
| C5g | inventive | 29 | | | 12 | 59 | Adimoll BO | 25 | 0.8 | Uvacure 1500 |
| C6a | comparative | 29 | | | 12 | 59 | Adimoll DB | 5 | 0.8 | Uvacure 1500 |
| C6b | inventive | 29 | | | 12 | 59 | Adimoll DB | 10 | 0.8 | Uvacure 1500 |
| C6c | inventive | 29 | | | 12 | 59 | Adimoll DB | 15 | 0.8 | Uvacure 1500 |
| C6d | inventive | 29 | | | 12 | 59 | Adimoll DB | 20 | 0.8 | Uvacure 1500 |
| C6e | inventive | 29 | | | 12 | 59 | Adimoll DB | 25 | 0.8 | Uvacure 1500 |
| C7a | comparative | 29 | | | 12 | 59 | Adimoll DO | 5 | 0.8 | Uvacure 1500 |
| C7b | inventive | 29 | | | 12 | 59 | Adimoll DO | 10 | 0.8 | Uvacure 1500 |
| C7c | inventive | 29 | | | 12 | 59 | Adimoll DO | 15 | 0.8 | Uvacure 1500 |
| C7d | inventive | 29 | | | 12 | 59 | Adimoll DO | 20 | 0.8 | Uvacure 1500 |
| C7e | inventive | 29 | | | 12 | 59 | Adimoll DO | 25 | 0.8 | Uvacure 1500 |
| C8a | comparative | 29 | | | 12 | 59 | Unimoll AGF | 5 | 0.8 | Uvacure 1500 |
| C8b | comparative | 29 | | | 12 | 59 | Unimoll AGF | 10 | 0.8 | Uvacure 1500 |
| C8c | inventive | 29 | | | 12 | 59 | Unimoll AGF | 12.5 | 0.8 | Uvacure 1500 |
| C8d | inventive | 29 | | | 12 | 59 | Unimoll AGF | 15 | 0.8 | Uvacure 1500 |
| C8e | inventive | 29 | | | 12 | 59 | Unimoll AGF | 17.5 | 0.8 | Uvacure 1500 |
| C8f | inventive | 29 | | | 12 | 59 | Unimoll AGF | 20 | 0.8 | Uvacure 1500 |
| C8g | inventive | 29 | | | 12 | 59 | Unimoll AGF | 25 | 0.8 | Uvacure 1500 |
| C9a | comparative | 29 | | | 12 | 59 | Uniplex DBS | 5 | 0.8 | Uvacure 1500 |
| C9b | inventive | 29 | | | 12 | 59 | Uniplex DBS | 10 | 0.8 | Uvacure 1500 |
| C9c | inventive | 29 | | | 12 | 59 | Uniplex DBS | 15 | 0.8 | Uvacure 1500 |
| C9d | inventive | 29 | | | 12 | 59 | Uniplex DBS | 20 | 0.8 | Uvacure 1500 |
| C10a | comparative | 29 | | | 12 | 59 | DOS | 5 | 0.8 | Uvacure 1500 |
| C10b | inventive | 29 | | | 12 | 59 | DOS | 10 | 0.8 | Uvacure 1500 |
| C10c | inventive | 29 | | | 12 | 59 | DOS | 15 | 0.8 | Uvacure 1500 |
| C10d | inventive | 29 | | | 12 | 59 | DOS | 20 | 0.8 | Uvacure 1500 |
| C10e | inventive | 29 | | | 12 | 59 | DOS | 25 | 0.8 | Uvacure 1500 |
| C11a | comparative | 29 | | | 12 | 59 | stearyl alcohol | 2.5 | 0.8 | Uvacure 1500 |
| C11b | inventive | 29 | | | 12 | 59 | stearyl alcohol | 5 | 0.8 | Uvacure 1500 |
| C11c | inventive | 29 | | | 12 | 59 | stearyl alcohol | 7.5 | 0.8 | Uvacure 1500 |
| C11d | inventive | 29 | | | 12 | 59 | stearyl alcohol | 10 | 0.8 | Uvacure 1500 |
| C11e | comparative | 29 | | | 12 | 59 | stearyl alcohol | 12.5 | 0.8 | Uvacure 1500 |
| C12a | comparative | 29 | | | 12 | 59 | DCHP | 15 | 0.8 | Uvacure 1500 |
| C12b | comparative | 29 | | | 12 | 59 | Palatinol M | 15 | 0.8 | Uvacure 1500 |
| C12c | comparative | 29 | | | 12 | 59 | Plastomoll DNA | 15 | 0.8 | Uvacure 1500 |
| C12d | comparative | 29 | | | 12 | 59 | Ultramoll M NV | 15 | 0.8 | Uvacure 1500 |
| C12e | comparative | 29 | | | 12 | 59 | Hexamoll DINCH | 15 | 0.8 | Uvacure 1500 |
| C12f | comparative | 29 | | | 12 | 59 | Plaxter B271 | 15 | 0.8 | Uvacure 1500 | n-BA = n-butyl acrylate
NtBAM = N-tert-butylacrylamide
StAc = stearyl acrylate
AA = acrylic acid
2-EHA = 2-ethylhexyl acrylate
* parts by weight per 100 parts by weight of polymer
**parts by weight per 100 parts by weight of overall adhesive component blend The designations of commercial additives represent the following compounds:

Triacetin (Sigma Aldrich): glycerol triacetate CAS [102-76-1]
Diacetin (Sigma Aldrich): glycerol diacetate CAS [25395-31-7]
Ethomeen C25 (Akzo Nobel): polyethylene(15)cocosamine CAS [61791-14-8]
Ethoduomeen T25 (Akzo Nobel): ethoxylated(15)N-tallow-1,3-diaminopropane CAS [61790-85-0]
Genamin O200 (Clariant): oleylamine oxethylate, (N-di-polyoxyethylene-(20)-N-oleylamine) CAS [112-69-6]/CAS [26635-93-8]
Adimoll BO (Lanxess): benzyl 2-ethylhexyl adipate CAS [58394-64-2]
Adimoll DB (Lanxess): di-n-butyl adipate CAS [105-99-7]
Adimoll DO (Lanxess): di-2-ethylhexyl adipate CAS [103-23-1]
Unimoll AGF (Lanxess): glycerol acetate mixture
Uniplex DBS (BCD): dibutyl sebacate CAS [109-43-3]
Uniplex DOS (BCD): di-(2-ethylhexyl) sebacate CAS [122-62-3]
DCHP (BCD): dicyclohexyl phthalate CAS [84-61-7]
Palatinol M (BASF): dimethyl phthalate CAS [131-11-3]
Plastomoll DNA (BASF): diisononyl adipate CAS [33703-08-1]
Ultramoll M NV (Lanxess): adipic acid polyester CAS [25101-03-5]
Hexamoll DINCH (BASF): diisononyl 1,2-cyclohexanedicarboxylate CAS [166412-78-8]
Plaxter B271 (BCD): dipropylene glycol dibenzoate CAS [27138-31-4]
Erisys GA240 (Emerald): N,N,N',N'-tetrakis(2,3-epoxypropyl)-m-xylene-α,α'-diamine CAS [63738-22-7]
Uvacure 1500 (Cytec) (3',4'-epoxycyclohexane)methyl 3,4-epoxycyclohexylcarboxylate CAS [2386-87-0]

The polymer was subsequently blended with the additive (amount as specified for the individual examples in Table 1—where, for example, for examples B11c and C11c the 7.5 wt % of additive correspond to 23.32 g of stearyl alcohol) and diluted with a 1:1 mixture of acetone and special-boiling-point spirit 60/95 to a solids content of 30%, and crosslinked with an epoxide, specifically either N,N,N',N'-Tetrakis(2,3-epoxypropyl)-m-xylene-α,α'-diamine, also called Erisys GA240, or (3',4'-epoxycyclohexane)methyl 3,4-epoxycyclohexylcarboxylate, also called Uvacure 1500, specifically in accordance with the composition as reproduced for the individual examples in Table 1. The properties of the resultant PSA were evaluated using a double-sided pressure-sensitively adhesively bonded assembly.

For the investigations, the resulting polymer solution was coated onto a siliconized polyethylene film. After drying for 20 minutes at 80° C. and conditioning for seven days at 23° C. and 50±5% relative humidity, the coat weight was 35 g/m² (adhesive tape b).

Producing a Bonded Assembly V

First of all the PSA from the examples was coated from solution on customary tesa liner material, siliconized on both sides and grained/structured, in order to obtain the best possible transfer of the liner structure into the acrylate PSA. After drying for 20 minutes at 80° C., the coat weight was 35 g/m².

On the adhesive side, the coated liner material was laminated with a PET film 23 μm thick which had been etched on either side with trichloroacetic acid. A transfer carrier was then used to laminate a commercial acrylate adhesive with a coat weight of 20 g/m² onto the uncoated side of the etched PET film in the assembly, and a PE-EVA foam with a thickness of 500 μm and a density of 270 kg/m³ was laminated on.

Atop this foam carrier, using a transfer carrier, a commercial acrylate PSA was then laminated with a coat weight of 40 g/m² onto the uncoated side of the previous assembly (open acrylate PSA layer).

The multilayer adhesive tape produced in this way is referred to as bonded assembly V.

Assessments of Suitability for Application

The evaluation yardsticks in the following test methods were each selected such that a "o" represents a result considered satisfactory for use in flexographic printing, whereas "−" values (and especially "−−" values) lead, based on experience, to considerable problems in operation that are no longer tolerable.

"+" and "++" values characterise adhesive tape specimens which in operation cause hardly any or virtually no problems in respect of the property being tested.

Standard Plate Bonding Assessment (Test 1)

Specimens measuring 250 mm×160 mm were cut from the double-sided bonded assembly under investigation. These specimens were adhered using the commercial, open acrylate PSA layer to a steel cylinder having a diameter of 110 mm, in such a way that the shorter edges of the specimens were aligned in the lengthwise direction of the cylinder. The liner material was then removed, now exposing the layer of the PSA of the invention. Atop the bonded assembly specimens thus bonded, a whole-area-exposed printing plate from DuPont Cyrel HOS with dimensions of 210 mm length×120 mm width×1.7 mm thickness was adhered to the PSA of the invention in such a way that the underlying bonded assembly stuck out at each edge by 20 mm (centred application on the bonded assembly specimen).

The procedure of applying a printing plate involved one of the shorter edges of the plate (transverse edge) being applied at a distance of 20 mm from one of the shorter edges of the bonded assembly specimen, parallel to that edge, to the specimen. Then, starting from this edge, the plate was rolled on using a plastic roller (width 100 mm, diameter 30 mm, Shore hardness A 45). The rolling movement took place in the lengthwise direction of the printing cylinder and perpendicularly, and was performed continuously from a longitudinal edge of the plate in each case to the opposite longitudinal edge of the plate, and back again. The rolling speed was 10 m/min in the transverse direction. At the same time, the printing cylinder rotated with a superficial velocity of 0.6 m/min, and so the plastic roller relative to the printing plate described a zig-zag movement in the direction of the second transverse edge of the plate. The printing plate was mounted on the bonded assembly using the corresponding pressing force needed to fix the plate over the whole area and without edge lifting. The entire procedure was repeated twice. The printing cylinder was aligned in such a way that both short edges of the bonded plate were at a height above the axis of rotation of the cylinder (open region oriented upwards). The specimens bonded to the printing cylinder were subsequently stored for three days (72 hours) under different climatic conditions.

The recovery behaviour of the plate means that it has a tendency towards edge lifting. The acrylate PSA of the invention on the plate side (see inventive examples in Table 1 and also 3 and 4) is selected such that there is no edge lifting of the plate from the bonded assembly. Depending on the stability of the bond between the PSA of the invention and the printing plate, there is detachment of the plate edges (cf. FIG. 4; shown here for only one edge, for simplification;

21=printing plate; 22=bonded assembly; 23=cylinder). To asses—this behaviour, a determination is made of the length L of the lifted plate edge up to the first remaining point of contact with the substrate (average value in each case from the evaluation of both edges and three measurement runs).

The test was carried out on the one hand with fresh adhesive tape specimens (one week old) and on the other with adhesive tape specimens having been stored for a period of 4 weeks at 40° C., and was carried out under two different sets of conditions: firstly, at room temperature (23° C. and 50% relative humidity), and secondly at 35° C. and a relative humidity of 85±5%.

Edge Lifting Evaluation Scheme:

| Length of edge lifting [mm] | Evaluation |
|---|---|
| ≤2 mm | ++ |
| ≤5 mm | + |
| ≤8 mm | 0 | creases, when the printing plate is removed again from the bonded assembly. Both requirements are regularly imposed by the customers in the printing industry, who on the one hand expect reliable fixing of the plate to sleeve or cylinder, but on the other hand are frequently required to adjust the plate for precise fixing, in the course of which the adhesive tape used for bonding is not to suffer damage and must not become detached.

Selection of Suitable Additives by Accelerated Ink Resistance Testing (Test 2)

An aluminized paper carrier with a full-area black print on the aluminium coating (ink based on cellulose nitrate) was wetted with the additives of the invention and then rubbed with absorbent cotton. The activity of the additive of the invention with respect to interaction with cellulose nitrate was derived from the ink abrasion (severe ink abrasion=high solvency of cellulose nitrate; little or no ink abrasion=poor solvency of cellulose nitrate). The result is reproduced in Table 2 below.

TABLE 2

Results of accelerated ink resistance testing

| Class of substance | Additive | Chemical name | CAS-number | Accelerated test [solvency of CN-varnish] |
|---|---|---|---|---|
| Adipates | Adimoll BO | Benzyl-2-ethylhexyl adipate | 58394-64-2 | Very good solvency |
| | Adimoll DB | Di-n-butyl adipate | 105-99-7 | Very good solvency |
| | Adimoll DO | Di-2-ethylhexyl adipate | 103-23-1 | Good solvency |
| | Plastomoll DNA | Diisononyl adipate | 33703-08-1 | Poor solvency |
| | Ultramoll M | Adipic acid polyester | 25101-03-5 | Poor solvency |
| | Palamoll 652 | Polyester based on adipic acid and polyhydric alcohols | 208945-13-5 | Poor solvency |
| Sebacates | MONOPLEX® DOS | Di-2-ethylhexyl sebacate | 122-62-3 | Good solvency |
| | DBS | Dibutyl sebacate | 109-43-3 | Good solvency |
| | glycerol | | 56-81-5 | Poor solvency |
| | Triacetin | Glycerol triacetate | 102-76-1 | Very good solvency |
| | Diacetin | Glycerol diacetate | 25395-31-7 | Good solvency |
| | Unimoll AGF | Glycerol acetate mixture | — | Very good solvency |
| | Uniplex 50 | Mixed Diethylene Glycol Dibenzoate and Dipropylene Glycol Dibenzoate | 120-55-8 and 27138-31-4 | Poor solvency |
| | Hexamoll DINCH | Diisononyl 1,2-cyclohexanedicarboxylate | 166412-78-8 | Poor solvency |
| | Plaxter B271 | Dipropylene glycol dibenzoate | 27138-31-4 | Poor solvency |
| Sulphonates | Mesamoll | Alkylsulphonic ester of phenol | 091082-17-6 | Poor solvency |
| Phthalates | DCHP | Dicyclohexyl phthalate | 84-61-7 | Solid |
| | Palatinol M | Dimethyl phthalate | 131-11-3 | Good solvency |
| | Palatinol N | Diisononyl phthalate | 28553-12-0 | Moderate solvency |
| Ethox.-Amines | Genamin O 200 | Oleylamine oxethylate, (N-di-polyoxyethylene-(20)-N-oleylamine) | 112-69-6/ 26635-93-8 | Good solvency |
| | Ethomeen C25 | Polyethylene(15)cocosamine | 61791-14-8 | Very good solvency |
| | Ethoduomeen T25 | Ethoxylated(15) N-tallow-1,3-diaminopropane | 61790-85-0 | Very good solvency |

-continued

| Length of edge lifting [mm] | Evaluation |
|---|---|
| ≤11 mm | − |
| >11 mm | −− |

A further determination is made as to whether the bonded assembly remains adhering reliably to the respective substrate, without forming bubbles and/or without forming Assessment of Ink Resistance—Cellulose Nitrate Application Test (Test 3)

In order to assess the resistance of the adhesive to influences of the binders in printing inks, a 0.1% strength solution of cellulose nitrate in ethanol was prepared. The test was carried out using the low-viscosity Walsroder® Nitrocellulose A400, which has a nitrogen content of 10.7%-11.3% and a degree of substitution of 1.89-2.05. A specimen printing plate is cleaned with ethanol and left for half an hour to evaporate. Using absorbent cotton, the cellulose nitrate solution is applied to the plate with a wiping motion. The treated plate, which is 1.14 mm thick, must be left to evaporate for at least 5 minutes for complete devolatilization of the ethanol used for the solution. If the plate is bonded earlier, the test does not work, since the residual ethanol on the bonding surface ensures that the cellulose nitrate is dissolved into the adhesive and there is therefore no longer any interaction. The plate applied in accordance with standard plate bonding is stored at 40° C. for three days. An assessment is made of the force required for demounting. The assessment parameter in each case is the subjective force which has to be exerted. The evaluation scheme below was drawn up such that a force expenditure denoted with "o" was considered by experts to be acceptable for use. Adverse evaluations ("−") were considered no longer acceptable for daily use.

Evaluation Scheme

| | |
|---|---|
| Little force expended | + |
| Moderate force expended | O |
| High force expended | − |

Solvent Resistance (Test 4)

The test specimens were mounted as in test 1 (assessment of edge lifting). The printing cylinder was oriented so that both short edges of the bonded plate were at a height above the axis of rotation of the cylinder (open region of the cylinder oriented upwards).

Using a pipette, a solvent mixture (1/8 ethyl acetate/1/8 n-propanol/6/8 ethanol) was applied to both edges for 1 minute so that the edges were continuously under the influence of solvent. The amount of solvent applied was just enough to wet both edges permanently with solvent (test conditions: 25° C., 50±5% relative humidity).

After the end of the wetting time, the cylinder was stood on one of its edges to allow excess solvent to run off.

Observation was made to determine whether the short edges of the plate had lifted from the bonded assembly. A measure of the edge lifting in this case was the length L of the no longer bonded part of the printing plate (of the lifted printing plate part), measured 60 minutes after the end of the wetting time, and measured in the tangential direction and from the free end up to the first point of remaining bonding (cf. FIG. 1: 1=printing plate, 2=bonded assembly, 3=printing cylinder, L=length of the lifted printed plate part).

Evaluation Scheme:

| Edge lifting after solvent exposure | Evaluation |
|---|---|
| <5 mm | ++ |
| 5 to <10 mm | + |
| 10 to <15 mm | 0/+ |
| 15 to <20 mm | 0 |
| 20 to <25 mm | 0/− |
| 25 to <30 mm | − |
| 30 mm or more | −− |

The results of the tests are shown in the following two tables, where polymer composition 1 contains 72 wt % n-butylamide, 10 wt % N-tert-butylacrylamide, 15 wt % stearyl acrylate and 3 wt % acrylic acid, and polymer composition 2 contains 59 wt % ethylhexyl acrylate, 29 wt % n-butyl acrylate and 12 wt % acrylic acid.

TABLE 3

Results of assessment of application suitability (ink resistance, mounting and solvent resistance) - polymer composition 1

| | Ink resistance | Edge lifting, 1.7 mm plate* | | | | Solvent resistance* |
|---|---|---|---|---|---|---|
| | | Fresh | | 4 Wks 40° C. | | |
| | | RT | 35° C./85% | RT | 35° C./85% | |
| V1 | − | ++ | + | ++ | ++ | + |
| V2 | − | ++ | + | ++ | + | O |
| V3 | − | ++ | ++ | ++ | ++ | −− |
| B0a | − | ++ | ++ | | | |
| B0b | − | ++ | ++ | | | |
| B0c | − | ++ | + | | | |
| B0d | − | ++ | + | | | |
| B0e | − | ++ | ++ | | | |
| B0f | − | ++ | −− | −− | −− | −− |
| B1a | + | ++ | ++ | | | |
| B1b | − | ++ | + | | | |
| B1c | O | ++ | O | | | |
| B2a | − | ++ | + | − | | |
| B2b | O | ++ | O | −− | | |
| B2c | + | ++ | −− | −− | | −− |
| B2d | + | ++ | −− | −− | | |
| B2e | + | + | −− | −− | | |
| B3a | − | ++ | ++ | O | | |
| B3b | O | ++ | + | −− | | |
| B3c | + | ++ | −− | −− | | −− |
| B3d | + | + | −− | −− | | |
| B3e | + | O | −− | −− | | |
| B4a | − | − | O | −− | −− | |
| B4b | + | −− | −− | −− | −− | |
| B4c | + | −− | −− | −− | −− | |
| B4d | + | −− | −− | −− | −− | |
| B4e | ++ | −− | −− | −− | −− | |
| B5a | − | ++ | + | −− | | |
| B5b | O | ++ | − | −− | | |
| B5c | + | ++ | −− | −− | | −− |
| B5d | + | ++ | −− | −− | | |
| B5e | + | ++ | −− | −− | | |
| B5f | + | + | −− | −− | | |
| B5g | + | + | −− | −− | | |
| B6a | − | ++ | + | | | |
| B6b | O | O | O | −− | | |
| B6c | + | − | −− | −− | | |
| B6d | + | −− | −− | −− | | |
| B6e | ++ | −− | −− | −− | | |
| B7a | − | ++ | ++ | −− | | |
| B7b | O | + | − | −− | | |
| B7c | + | − | −− | −− | | −− |
| B7d | ++ | −− | −− | −− | | |
| B7e | ++ | −− | −− | −− | | |
| B8a | − | ++ | ++ | O | − | |
| B8b | − | ++ | O | −− | | |
| B8c | + | ++ | − | −− | | −− |
| B8d | + | ++ | −− | −− | | |
| B8e | + | ++ | −− | −− | | |
| B8f | + | ++ | −− | −− | | |
| B8g | + | + | −− | −− | | |
| B9a | − | ++ | + | −− | | |
| B9b | O | ++ | O | −− | | |
| B9c | + | − | −− | −− | | |
| B9d | + | − | −− | − | | |
| B10a | − | ++ | + | O | −− | |
| B10b | O | ++ | O | −− | | |
| B10c | + | ++ | −− | −− | | |
| B10d | + | + | −− | −− | | |
| B10e | ++ | + | −− | −− | | |
| B11a | − | ++ | O | ++ | −− | |
| B11b | O | ++ | O | ++ | −− | |
| B11c | + | ++ | O | ++ | −− | |
| B11d | O | ++ | O | ++ | −− | |
| B11e | − | ++ | −− | ++ | −− | |
| B12a | − | ++ | + | ++ | − | −− |
| B12b | − | ++ | ++ | ++ | O | −− |
| B12c | + | −− | −− | −− | −− | −− |
| B12d | − | −− | −− | −− | −− | |
| B12e | − | −− | −− | −− | −− | |

TABLE 3-continued

Results of assessment of application suitability (ink resistance, mounting and solvent resistance) - polymer composition 1

| | Ink resistance | Edge lifting, 1.7 mm plate* | | | | Solvent resistance* |
|---|---|---|---|---|---|---|
| | | Fresh | | 4 Wks 40° C. | | |
| | | RT | 35° C./85% | RT | 35° C./85% | |
| B12f | − | −− | −− | −− | −− | −− |
| B12g | − | −− | −− | −− | −− | −− |

TABLE 4

Results of assessment of application suitability (ink resistance, mounting and solvent resistance) - polymer composition 2

| | Ink resistance | Edge lifting, 1.7 mm plate* | | | | Solvent resistance* |
|---|---|---|---|---|---|---|
| | | Fresh | | 4 Wks 40° C. | | |
| | | RT | 35° C./85% | RT | 35° C./85% | |
| C1a | − | ++ | ++ | | | + |
| C1b | − | ++ | + | | | + |
| C1c | O | ++ | O | | | O |
| C0a | − | ++ | ++ | | | + |
| C0b | − | ++ | ++ | | | + |
| C0c | − | ++ | + | | | + |
| C0d | − | ++ | + | | | + |
| C0e | − | ++ | ++ | | | + |
| C0f | − | ++ | −− | −− | −− | − |
| C2a | − | ++ | + | + | O | + |
| C2b | O | + | O | − | −− | O |
| C2c | + | O | −− | −− | −− | −− |
| C2d | + | − | −− | −− | −− | −− |
| C2e | + | −− | −− | −− | −− | −− |
| C3a | − | ++ | ++ | + | O | + |
| C3b | O | ++ | + | O | − | O |
| C3c | + | O | −− | −− | −− | −− |
| C3d | + | −− | −− | −− | −− | −− |
| C3e | + | −− | −− | −− | −− | −− |
| C4a | − | + | O | O | −− | O |
| C4b | + | − | −− | −− | −− | − |
| C4c | + | −− | −− | −− | −− | −− |
| C4d | + | −− | −− | −− | −− | −− |
| C4e | ++ | −− | −− | −− | −− | −− |
| C5a | − | ++ | + | O | − | + |
| C5b | O | ++ | + | −− | −− | O |
| C5c | + | ++ | − | −− | −− | − |
| C5d | + | ++ | −− | −− | −− | −− |
| C5e | + | + | −− | −− | −− | −− |
| C5f | + | + | −− | −− | −− | −− |
| C5g | + | + | −− | −− | −− | −− |
| C6a | − | ++ | + | − | −− | + |
| C6b | O | O | O | −− | −− | O |
| C6c | + | − | −− | −− | −− | −− |
| C6d | + | −− | −− | −− | −− | −− |
| C6e | ++ | −− | −− | −− | −− | −− |
| C7a | − | ++ | ++ | −− | −− | + |
| C7b | + | + | − | −− | −− | O |
| C7c | ++ | − | −− | −− | −− | − |
| C7d | ++ | −− | −− | −− | −− | −− |
| C7e | ++ | −− | −− | −− | −− | −− |
| C8a | − | ++ | ++ | − | −− | + |
| C8b | − | ++ | + | −− | −− | O |
| C8c | + | ++ | O | −− | −− | − |
| C8d | + | ++ | − | −− | −− | −− |
| C8e | + | ++ | −− | −− | −− | −− |
| C8f | + | ++ | −− | −− | −− | −− |
| C8g | + | + | −− | −− | −− | −− |
| C9a | − | ++ | ++ | O | −− | + |
| C9b | O | ++ | + | −− | −− | O |
| C9c | + | − | O | −− | −− | −− |
| C9d | + | − | −− | −− | −− | −− |
| C10a | − | ++ | ++ | − | −− | + |
| C10b | O | ++ | + | −− | −− | O |

TABLE 4-continued

Results of assessment of application suitability (ink resistance, mounting and solvent resistance) - polymer composition 2

| | Ink resistance | Edge lifting, 1.7 mm plate* | | | | Solvent resistance* |
|---|---|---|---|---|---|---|
| | | Fresh | | 4 Wks 40° C. | | |
| | | RT | 35° C./85% | RT | 35° C./85% | |
| C10c | + | ++ | O | −− | −− | −− |
| C10d | + | + | −− | −− | −− | −− |
| C10e | ++ | + | −− | −− | −− | −− |
| C11a | − | ++ | ++ | ++ | ++ | ++ |
| C11b | O | ++ | + | ++ | + | + |
| C11c | + | ++ | + | ++ | + | O |
| C11d | + | ++ | O | ++ | − | O |
| C11e | + | ++ | − | ++ | −− | − |
| C12a | − | + | + | + | − | − |
| C12b | − | + | + | + | O | − |
| C12d | − | O | − | −− | −− | − |
| C12d | − | O | − | −− | −− | − |
| C12e | − | −− | −− | −− | −− | − |
| C12f | − | −− | −− | −− | −− | − |

The invention claimed is:

1. Method for the bonding of printing plates to printing cylinders and/or printing sleeves with a pressure-sensitive adhesive comprising at least one adhesive component comprising at least one polymer component based on a monomer mixture comprising at least one of the following monomers:
    at least one acrylic ester
    at least one methacrylic ester
    acrylic acid
    methacrylic acid
wherein the pressure-sensitive adhesive further comprises 1 to 25 wt %, based on the overall blend of the at least one adhesive component without solvent, of at least one compound selected from the group consisting of stearyl alcohol, aliphatic dicarboxylic esters, acetylated polyols and ethoxylated fatty acid amines.

2. Method according to claim 1, wherein the at least one compound is selected from the group consisting of polyethylene(15)cocosamine, ethoxylated(15)N-tallow-1,3-diaminopropane, oleylamine oxethylate, benzyl-2-ethylhexyl adipate, di-n-butyl adipate, di-2-ethylhexyl adipate, glycerol acetate, dibutyl sebacate and di-(2-ethylhexyl)-sebacate.

3. Method according to claim 1, wherein the at least one compound is stearyl alcohol and is present in an amount of 1 to 15 wt %, based on the overall blend of the at least one adhesive component without solvent.

4. Method according to claim 1, wherein the monomer mixture comprises at least the following monomers:
   a) 20 to 99.5 wt % of at least one acrylic ester and/or methacrylic ester whose homopolymer has a static glass transition temperature of <0° C.;
   b) 0 to 40 wt % of at least one acrylic ester and/or methacrylic ester whose homopolymer has a static glass transition temperature of >0° C.;
   c) 0.5 to 20 wt % of acrylic acid and/or methacrylic acid;
   d) 0 to 25 wt % of further copolymerizable monomers, the quantity figures being based in each case on the monomer mixture.

5. Method according to claim 4, wherein the polymer component or polymer components based on monomer mixtures comprising the monomers a) to d) or i.a) to i.d) or ii.a) to ii.c) or iii.a) to iii.d) make(s) up at least 90 wt % of the adhesive component or components.

6. Method according to claim 1, wherein the monomer mixture comprises at least the following monomers:

i.a) 50-99.5 wt % of at least one acrylic ester and/or methacrylic ester having the following formula:

$CH_2=C(R_1)(COOR_2)$, where

R$_1$=H and R$_2$ is a linear alkyl radical having 2 to 10 carbon atoms or is a branched, non-cyclic alkyl radical having at least 4 carbon atoms, and/or R$_1$=CH$_3$ and R$_2$ is a linear alkyl radical having 8 to 10 carbon atoms or is a branched, non-cyclic alkyl radical having at least 10 carbon atoms;

i.b) 0 to 40 wt % of at least one acrylic ester and/or methacrylic ester having the following formula:

$CH_2=C(R_3)(COOR_4)$, where

R$_3$=H or CH$_3$ and R$_4$ is a linear alkyl radical having at least 12 carbon atoms;

i.c) 0.5-20 wt % of acrylic acid and/or methacrylic acid;

i.d) 0-25 wt % of at least one N-alkyl-substituted acrylamide, where the quantity figures are based in each case on the monomer mixture.

7. Method according to claim 1, wherein the monomer mixture comprises at least the following monomers:

ii.a) 49.5-89.5 wt % of at least one acrylic ester and/or methacrylic ester and/or their free acids, having the following formula:

$CH_2=C(R_5)(COOR_6)$, where

R$_5$=H or CH$_3$ and R$_6$ is an alkyl radical having 1 to 10 carbon atoms or H and the homopolymer has a static glass transition temperature of <−30° C.;

ii.b) 10 to 40 wt % of at least one acrylic ester and/or methacrylic ester having the following formula:

$CH_2=C(R_7)(COOR_6)$, where

R$_7$=H or CH$_3$ and R$_8$ is a cyclic alkyl radical having at least 8 carbon atoms or is a linear alkyl radical having at least 12 carbon atoms and the homopolymer has a static glass transition temperature T$_g$ of at least 30° C.;

ii.c) 0.5 to 10 wt % of at least one acrylic ester and/or methacrylic ester and/or their free acids, having the following formula:

$CH_2=C(R_9)(COOR_{10})$, where

R$_9$=H or CH$_3$ and R$_{10}$=H or an aliphatic radical having a functional group X, where X comprises COOH, OH, —NH(R$_{11}$), SH, SO$_3$H, where R$_{11}$=H or a linear or branched alkyl radical having up to 10 carbon atoms, and the homopolymer has a static glass transition temperature T$_g$ of at least 30° C., where the quantity figures are based in each case on the monomer mixture.

8. Method according to claim 1, wherein the monomer mixture comprises at least the following monomers:

iii.a) 25 to 82 wt % of linear acrylic esters having 2 to 10 carbon atoms in the alkyl radical;

iii.b) 10 to 40 wt % of branched, non-cyclic acrylic esters having a static glass transition temperature T$_g$ of not more than 0° C.;

iii.c) 8 to 15 wt % of acrylic acid, based on the total amount of monomers to be polymerized;

iii.d) optionally up to 10 wt % of further copolymerizable monomers, based on the total amount of monomers to be polymerized, where the ratio of the linear acrylic esters to the branched acrylic esters is in the range from 1:6 to 10:1 mass fractions.

9. Method according to claim 1, wherein the pressure-sensitive adhesive is in crosslinked form.

10. Method according to claim 1, wherein the pressure-sensitive adhesive is provided in the form of an adhesive tape.

* * * * *